(12) United States Patent
Hartmann et al.

(10) Patent No.: US 9,938,365 B2
(45) Date of Patent: *Apr. 10, 2018

(54) ARTICLES CONTAINING PRECISELY BRANCHED FUNCTIONAL POLYMERIC PHASE CHANGE MATERIALS

(71) Applicant: Outlast Technologies, LLC, Golden, CO (US)

(72) Inventors: Mark Hartmann, Boulder, CO (US); David E. Henton, Midland, MI (US)

(73) Assignee: Outlast Technologies, LLC, Golden, CO (US)

( * ) Notice: Subject to any disclaimer, the term of this patent is extended or adjusted under 35 U.S.C. 154(b) by 723 days.

This patent is subject to a terminal disclaimer.

(21) Appl. No.: 14/175,026

(22) Filed: Feb. 7, 2014

(65) Prior Publication Data

US 2014/0221575 A1 Aug. 7, 2014

Related U.S. Application Data

(63) Continuation of application No. 13/040,692, filed on Mar. 4, 2011, now Pat. No. 8,673,448.

(51) Int. Cl.
  *C08F 210/06* (2006.01)
  *C08F 120/32* (2006.01)
  (Continued)

(52) U.S. Cl.
  CPC ............ *C08F 210/06* (2013.01); *C08F 20/32* (2013.01); *C08F 32/04* (2013.01); *C08F 36/20* (2013.01);
  (Continued)

(58) Field of Classification Search
  None
  See application file for complete search history.

(56) References Cited

U.S. PATENT DOCUMENTS 3,926,899 A 12/1975 Nordberg
4,154,462 A 5/1979 Golden et al.
(Continued)

FOREIGN PATENT DOCUMENTS

CN 1149878 A 5/1997
CN 1172488 A 2/1998
(Continued)

OTHER PUBLICATIONS

Berda, Eric B., "ADMET Amphiphiles", "Dissertation to the University of Florida", 2008, p. 149, Publisher: U. FLA., Published in: US.
(Continued)

*Primary Examiner* — Ronak C Patel
*Assistant Examiner* — Thomas A Mangohig
(74) *Attorney, Agent, or Firm* — Neugeboren O'Dowd PC

(57) ABSTRACT

A temperature regulating article comprises a substrate and a polymeric phase change material bound to the substrate, wherein the polymeric phase change material is characterized by including a precisely branched polymer with substantially equally spaced repeating sidechains. In other embodiments the polymeric phase change material includes between 20 and 200 branches per 1000 carbon units, has a latent heat of at least 5 Joules per gram, and a transition temperature between 0° C. and 40° C.

25 Claims, 17 Drawing Sheets

(51) Int. Cl.

| | | |
|---|---|---|
| *C08F 136/06* | (2006.01) | |
| *C08F 236/06* | (2006.01) | |
| *C08F 32/04* | (2006.01) | |
| *C08F 36/20* | (2006.01) | |
| *C08F 20/32* | (2006.01) | |
| *D06M 15/227* | (2006.01) | |
| *D06M 15/27* | (2006.01) | |
| *D06M 15/327* | (2006.01) | |
| *D01F 1/10* | (2006.01) | |
| *C08F 220/32* | (2006.01) | |

(52) U.S. Cl.
CPC .......... *C08F 120/32* (2013.01); *C08F 136/06* (2013.01); *C08F 236/06* (2013.01); *D01F 1/10* (2013.01); *D06M 15/227* (2013.01); *D06M 15/27* (2013.01); *D06M 15/327* (2013.01); *C08F 2220/325* (2013.01); *Y10T 428/2913* (2015.01); *Y10T 428/2933* (2015.01); *Y10T 428/31504* (2015.04); *Y10T 442/20* (2015.04); *Y10T 442/2213* (2015.04)

(56) References Cited

U.S. PATENT DOCUMENTS

| | | |
|---|---|---|
| 4,181,643 A | 1/1980 | Kreibich et al. |
| 4,259,198 A | 3/1981 | Kreibich et al. |
| 4,505,953 A | 3/1985 | Chen et al. |
| 4,708,812 A | 11/1987 | Hatfield |
| 4,756,958 A | 7/1988 | Bryant et al. |
| 4,851,291 A | 7/1989 | Vigo et al. |
| 4,871,615 A | 10/1989 | Vigo et al. |
| 4,908,238 A | 3/1990 | Vigo et al. |
| 5,120,349 A | 6/1992 | Stewart et al. |
| 5,156,911 A | 10/1992 | Stewart |
| 5,254,354 A | 10/1993 | Stewart |
| 5,254,380 A | 10/1993 | Salyer |
| 5,366,801 A | 11/1994 | Bryant et al. |
| 5,432,210 A | 7/1995 | Bogan |
| 5,433,953 A | 7/1995 | Tsuei et al. |
| 5,589,194 A | 12/1996 | Tsuei et al. |
| 5,718,835 A | 2/1998 | Momose et al. |
| 5,804,297 A | 9/1998 | Colvin et al. |
| 5,814,407 A | 9/1998 | Richard et al. |
| 5,866,663 A | 2/1999 | Brookhart et al. |
| 5,885,475 A | 3/1999 | Salyer |
| 5,897,952 A | 4/1999 | Vigo et al. |
| 5,969,070 A | 10/1999 | Waymouth et al. |
| 5,985,309 A | 11/1999 | Edwards et al. |
| 6,004,662 A | 12/1999 | Buckley |
| 6,015,570 A | 1/2000 | Tucci et al. |
| 6,025,287 A | 2/2000 | Hermann |
| 6,063,312 A | 5/2000 | Mannheimer |
| 6,207,738 B1 | 3/2001 | Zuckerman et al. |
| 6,319,599 B1 | 11/2001 | Buckley |
| 6,379,753 B1 | 4/2002 | Soane et al. |
| 6,380,336 B1 | 4/2002 | Soane et al. |
| 6,387,492 B2 | 5/2002 | Soane et al. |
| 6,408,256 B1 | 6/2002 | Hittle et al. |
| 6,472,476 B1 | 10/2002 | Soane et al. |
| 6,485,530 B1 | 11/2002 | Soane et al. |
| 6,497,732 B1 | 12/2002 | Linford et al. |
| 6,497,733 B1 | 12/2002 | Ware, Jr. et al. |
| 6,503,976 B2 | 1/2003 | Zuckerman et al. |
| 6,517,648 B1 | 2/2003 | Bouchette et al. |
| 6,517,933 B1 | 2/2003 | Soane et al. |
| 6,544,594 B2 | 4/2003 | Linford et al. |
| 6,566,544 B1 | 5/2003 | Waymouth et al. |
| 6,599,327 B2 | 7/2003 | Soane et al. |
| 6,607,564 B2 | 8/2003 | Soane et al. |
| 6,607,994 B2 | 8/2003 | Soane et al. |
| 6,617,267 B2 | 9/2003 | Soane et al. |
| 6,617,268 B1 | 9/2003 | Offord et al. |
| 6,620,515 B2 | 9/2003 | Feng et al. |
| 6,660,667 B2 | 12/2003 | Zuckerman et al. |
| 6,679,924 B2 | 1/2004 | Ware, Jr. et al. |
| 6,699,266 B2 | 3/2004 | Lachenbruch et al. |
| 6,716,526 B2 | 4/2004 | Weston et al. |
| 6,787,624 B2 | 9/2004 | Coates et al. |
| 6,793,856 B2 | 9/2004 | Hartmann et al. |
| 6,815,486 B2 | 11/2004 | Bhagwagar et al. |
| 6,822,062 B2 | 11/2004 | Mackenzie et al. |
| 6,830,782 B2 | 12/2004 | Kanazawa |
| 6,855,410 B2 | 2/2005 | Buckley |
| 6,855,422 B2 | 2/2005 | Magill et al. |
| 7,053,163 B1 | 5/2006 | Tian et al. |
| 7,074,490 B2 | 7/2006 | Feng et al. |
| 7,081,501 B2 | 7/2006 | Okawa et al. |
| 7,119,154 B2 | 10/2006 | Coates et al. |
| 7,135,424 B2 | 11/2006 | Worley et al. |
| 7,160,612 B2 | 1/2007 | Magill et al. |
| 7,241,497 B2 | 7/2007 | Magill et al. |
| 7,268,243 B2 | 9/2007 | Coates et al. |
| 7,300,994 B2 | 11/2007 | Coates et al. |
| 7,560,523 B2 | 7/2009 | Coates et al. |
| 7,666,500 B2 | 2/2010 | Magill et al. |
| 7,790,283 B2 | 9/2010 | Hartmann et al. |
| 7,790,810 B2 | 9/2010 | Coates et al. |
| 8,221,910 B2 | 7/2012 | Hartmann et al. |
| 8,673,448 B2 * | 3/2014 | Hartmann ............... C08F 20/32 252/70 |
| 2001/0052193 A1 | 12/2001 | Payet et al. |
| 2002/0009473 A1 | 1/2002 | Tebbe |
| 2002/0068152 A1 | 6/2002 | Health et al. |
| 2002/0120988 A1 | 9/2002 | Soane et al. |
| 2002/0122890 A1 | 9/2002 | Linford et al. |
| 2002/0152560 A1 | 10/2002 | Soane et al. |
| 2002/0155771 A1 | 10/2002 | Soane et al. |
| 2002/0160675 A1 | 10/2002 | Linford et al. |
| 2002/0164473 A1 | 11/2002 | Buckley |
| 2002/0189024 A1 | 12/2002 | Soane et al. |
| 2002/0190408 A1 | 12/2002 | Houston et al. |
| 2002/0193028 A1 | 12/2002 | Zuckerman et al. |
| 2003/0008078 A1 | 1/2003 | Soane et al. |
| 2003/0013369 A1 | 1/2003 | Soane et al. |
| 2003/0027962 A1 | 2/2003 | Wagener et al. |
| 2003/0035951 A1 | 2/2003 | Magill et al. |
| 2003/0051295 A1 | 3/2003 | Soane et al. |
| 2003/0054141 A1 | 3/2003 | Worley et al. |
| 2003/0068482 A1 | 4/2003 | Koch et al. |
| 2003/0079302 A1 | 5/2003 | Soane et al. |
| 2003/0101518 A1 | 6/2003 | Linford et al. |
| 2003/0101522 A1 | 6/2003 | Linford et al. |
| 2003/0102080 A1 | 6/2003 | Malik |
| 2003/0104134 A1 | 6/2003 | Linford et al. |
| 2003/0143180 A1 | 7/2003 | Giroud et al. |
| 2003/0145397 A1 | 8/2003 | Ware, Jr. et al. |
| 2004/0011989 A1 | 1/2004 | Lin et al. |
| 2004/0026659 A1 | 2/2004 | Lin |
| 2004/0029472 A1 | 2/2004 | Yen-Shyi et al. |
| 2004/0033743 A1 | 2/2004 | Worley et al. |
| 2004/0043212 A1 | 3/2004 | Grynaeus et al. |
| 2004/0044128 A1 | 3/2004 | Lin et al. |
| 2004/0048541 A1 | 3/2004 | Offord et al. |
| 2004/0055093 A1 | 3/2004 | Offord et al. |
| 2004/0058006 A1 | 3/2004 | Barry et al. |
| 2004/0192835 A1 | 9/2004 | Steidl et al. |
| 2004/0258922 A1 | 12/2004 | Willett et al. |
| 2004/0260085 A1 | 12/2004 | Kriesel et al. |
| 2005/0046182 A1 | 3/2005 | Trapp et al. |
| 2005/0077208 A1 | 4/2005 | Miller et al. |
| 2005/0106392 A1 | 5/2005 | Sano et al. |
| 2005/0175560 A9 | 8/2005 | Ferrari |
| 2005/0208286 A1 | 9/2005 | Hartmann et al. |
| 2005/0208300 A1 | 9/2005 | Magill et al. |
| 2005/0233145 A1 | 10/2005 | Abe et al. |
| 2005/0281979 A1 | 12/2005 | Toes et al. |
| 2006/0037150 A1 | 2/2006 | Offord et al. |
| 2006/0043328 A1 | 3/2006 | Hunt et al. |
| 2006/0101997 A1 | 5/2006 | Py et al. |
| 2006/0178475 A1 | 8/2006 | Bentley et al. |
| 2006/0188582 A1 | 8/2006 | Naylor Da Rocha Gomes |
| 2006/0277933 A1 | 12/2006 | Smith |

(56) References Cited

U.S. PATENT DOCUMENTS

| | | |
|---|---|---|
| 2006/0286319 A1 | 12/2006 | Magill et al. |
| 2007/0026228 A1 | 2/2007 | Hartmann et al. |
| 2007/0049714 A1 | 3/2007 | Coates et al. |
| 2007/0079825 A1 | 4/2007 | Sera et al. |
| 2007/0104745 A1 | 5/2007 | Stewart et al. |
| 2007/0120927 A1 | 5/2007 | Snyder et al. |
| 2007/0165990 A1 | 7/2007 | Magill et al. |
| 2007/0173154 A1 | 7/2007 | Hartmann et al. |
| 2007/0212967 A1 | 9/2007 | Grynaeus et al. |
| 2007/0287008 A1 | 12/2007 | Hartmann et al. |
| 2008/0193761 A1 | 8/2008 | Gomes et al. |
| 2008/0214854 A1 | 9/2008 | Coates et al. |
| 2009/0035557 A1 | 2/2009 | Hartmann et al. |
| 2009/0192278 A1 | 7/2009 | Coates et al. |
| 2010/0011338 A1 | 1/2010 | Lewis et al. |
| 2010/0012883 A1 | 1/2010 | Hartmann et al. |
| 2010/0015430 A1 | 1/2010 | Hartmann et al. |
| 2010/0015869 A1 | 1/2010 | Hartmann et al. |
| 2010/0016513 A1 | 1/2010 | Hartmann et al. |
| 2010/0029882 A1 | 2/2010 | Coates et al. |
| 2010/0036077 A1 | 2/2010 | Coates et al. |
| 2010/0264353 A1 | 10/2010 | Hartmann et al. |
| 2012/0225290 A1 | 9/2012 | Hartmann et al. |
| 2013/0040526 A1 | 2/2013 | Hartmann et al. |

FOREIGN PATENT DOCUMENTS

| | | |
|---|---|---|
| CN | 1181089 A | 5/1998 |
| CN | 1317602 C | 10/2001 |
| CN | 1326473 A | 12/2001 |
| CN | 1446120 A | 10/2003 |
| CN | 1252025 C | 4/2006 |
| CN | 101189385 A | 5/2008 |
| EP | 1484378 | 12/2004 |
| EP | 1538173 A | 6/2005 |
| EP | 1783169 A2 | 5/2007 |
| EP | 1871948 A2 | 1/2008 |
| ES | 2298056 A1 | 5/2008 |
| FR | 2691969 A1 | 12/1993 |
| JP | 05-163485 A | 12/1991 |
| JP | 04163370 A2 | 6/1992 |
| JP | 04219349 B2 | 8/1992 |
| JP | 5005215 A2 | 1/1993 |
| JP | 05156570 A2 | 6/1993 |
| JP | 05156576 A2 | 6/1993 |
| JP | 5214672 A2 | 8/1993 |
| JP | 5239716 A2 | 9/1993 |
| JP | 5331754 A2 | 12/1993 |
| JP | 6041818 A2 | 2/1994 |
| JP | 2006200417 A2 | 7/1994 |
| JP | 06234840 A2 | 8/1994 |
| JP | 07-053917 | 9/1996 |
| JP | 08246227 A2 | 9/1996 |
| JP | 08311716 A1 | 11/1996 |
| JP | 11247069 A2 | 9/1999 |
| JP | 11350240 A2 | 12/1999 |
| JP | 2001172866 A2 | 6/2001 |
| JP | 2002317329 A1 | 10/2002 |
| JP | 2002348780 A2 | 12/2002 |
| JP | 2003020568 A2 | 1/2003 |
| JP | 2003027337 A2 | 1/2003 |
| JP | 2003268358 A2 | 9/2003 |
| JP | 2003268359 A2 | 9/2003 |
| JP | 2003268679 A2 | 9/2003 |
| JP | 2003293223 A2 | 10/2003 |
| JP | 2004003087 A2 | 1/2004 |
| JP | 2004011032 A2 | 1/2004 |
| JP | 2004026971 A | 1/2004 |
| JP | 2004027189 A2 | 1/2004 |
| JP | 2004043676 A | 2/2004 |
| JP | 2004161885 A2 | 6/2004 |
| JP | 2004324023 A | 11/2004 |
| JP | 2005036097 A2 | 2/2005 |
| JP | 2007137971 A2 | 6/2007 |
| JP | 2008522056 A | 6/2008 |
| JP | 537028 T2 | 9/2008 |
| PT | 0103265 A | 10/2006 |
| WO | 9324534 A1 | 12/1993 |
| WO | 09825710 A1 | 6/1998 |
| WO | 9949124 A2 | 9/1999 |
| WO | 0106054 A1 | 1/2001 |
| WO | 0135511 A2 | 5/2001 |
| WO | 0154809 A1 | 8/2001 |
| WO | 0212607 A2 | 2/2002 |
| WO | 0224789 A2 | 3/2002 |
| WO | 2004007631 A1 | 1/2004 |
| WO | 2004098767 A1 | 11/2004 |
| WO | 2005017247 A2 | 2/2005 |
| WO | 2005040300 A1 | 6/2005 |
| WO | 2005097935 A1 | 10/2005 |
| WO | 2006013165 A1 | 2/2006 |
| WO | 2006091286 A2 | 8/2006 |
| WO | 2006098851 A2 | 9/2006 |
| WO | 2006117702 A2 | 11/2006 |
| WO | 2007040395 A1 | 4/2007 |
| WO | 2007082559 A1 | 7/2007 |
| WO | 2007130709 A3 | 11/2007 |
| WO | 2008014164 A1 | 1/2008 |
| WO | 2008041191 A2 | 4/2008 |
| WO | 2008061885 A2 | 5/2008 |
| WO | 2008135208 A1 | 11/2008 |
| WO | 2010008906 A1 | 1/2010 |
| WO | 2010008908 A1 | 1/2010 |
| WO | 2010008909 A1 | 1/2010 |
| WO | 2010008910 A1 | 1/2010 |
| WO | 2012121848 A2 | 9/2012 |

OTHER PUBLICATIONS

Clariant, "Your Universally Applicable Polymer: Functional Chemicals Division", 2006, p. 36, Publisher: Clariant International Ltd, Functional Chemicals Division, Published in: CH.

Clariant, "Colour Chronicle", "Colour Chronicle 2", Oct. 2011, p. 28, No. 2, Publisher: Clariant Chemicals (India) Limited Publication, Published in: IN.

Chenggong, Jia, "Chinese Office Action re Application No. 200980132054.0", dated Jan. 16, 2014, p. 7, Published in: CN.

Chenggong, Jia, "Chinese Office Action re Application No. 200980132239.1", dated Mar. 5, 2013, p. 22, Published in: CN.

Chenggong, Jia, "Chinese Office Action re Application No. 200980132054.0", dated Apr. 23, 2013, p. 22, Published in: CN.

Zonghua, Ren, "Chinese Office Action re Application No. 200780003506.6", dated Apr. 28, 2012, p. 7, Published in: CN.

Chenggong, Jia, "Chinese Office Action re Application No. 200980132232.X", dated Jun. 4, 2013, p. 5, Published in: CN.

Zongua, Ren, "Chinese Office Action re Application No. 200780003506.6", dated Jul. 9, 2010, p. 14, Published in: CN.

Zonghua, Ren, "Chinese Office Action re Application No. 200780003506.6", dated Aug. 31, 2011, p. 8, Published in: CN.

Chenggong, Jia, "Chinese Office Action re Application No. 200980132232.X", dated Nov. 1, 2012, p. 53, Published in: CN.

Zonghua, Ren, "Response to Chinese Office Action re Application No. 200780003506.6", dated Jan. 20, 2011, p. 6, Published in: CN.

Neugeboren, Craig, "Response to Chinese Office Action dated Apr. 28, 2012 re Application No. 300780003506.6", dated Aug. 21, 2012, p. 3, Published in: US.

Neugeboren, Craig, "Reponse to Chinese Office Action dated Aug. 31, 2011 re Application No. 300780003506.6", dated Oct. 26, 2011, p. 3, Published in: US.

Neugeboren, Craig, "Reponse to Chinese Office Action dated Jul. 9, 2010 re Application No. 300780003506.6", dated Dec. 21, 2010, p. 5, Published in: US.

Domski, G.J., et al., "Living alkene polymerization: New methods for the precision synthesis of polyolefins", "Prog. Polym. Sci.", Nov. 2006, pp. 30-92, vol. 32, No. (2007), Publisher: Elsevier Ltd., Published in: US.

Dow, "Dow Elastomers: ENGAGE Product Selection Guide", "Webpage located at http://www.dow.com/elastomers/lit/engage_lit.html downloaded Jul. 10, 2012", Mar. 2012, p. 4, Publisher: The Dow Chemical Company, Published in: US.

(56) References Cited

OTHER PUBLICATIONS

Dow, "Dow Elastomers: AFFINITY Product Selection Guide", "Webpage located at http://www.dow.com/elastomers/lit/affinity_lit.htm downloaded Jul. 10, 2012", Nov. 2010, p. 4, Publisher: The Dow Chemical Company, Published in: US.
Dow Corning, "Dow Corning 8650 Polymer and Dow Corning BY16/876 Product Information Sheet", May 6, 2005, p. 2, Published in: US.
DuPont, "DuPont Elvaloy resins", "Webpage found at http://www2.dupont.com/Elvaloy/en_US downloaded", Oct. 19, 2012, p. 1, Publisher: DuPont, Published in: US.
DuPont, "DuPont Nucrel", "Webpage located at http://www2.dupont.com/Nucrel/en_US/ downloaded Jul. 10, 2012", 2012, No. 2, Publisher: DuPont, Published in: US.
Eldridge, J.E., et al., "Studies of the Cross-Linking Process in Gelatin Gels. III. Dependence of Melting Point on Concentration and Molecular We", Nov. 1954, pp. 992-995, vol. 58, Publisher: U. Wis., Published in: US.
Lorenz, Markus, "Response to EP Office Action re Application No. 08022533.7", dated Nov. 16, 2010, p. 29, Published in: EP.
Lorenz, Markus, "Response to European Office Action re Application No. 08022532.9", dated Nov. 16, 2010, p. 22, Published in: EP.
Hollender, C., "European Search Report re Application No. 08 02 2532", dated Dec. 4, 2009, p. 6, Published in: DE.
Hollender, C., "European Search Report re Application No. 08022533.7", dated Dec. 4, 2009, p. 7, Published in: EP.
Hollender, C., "European Search Report re Application No. 08022532.9", dated Dec. 4, 2009, p. 6, Published in: EP.
Exxonmobil, "Specialty Elastomers: Exact plastomers", "Webpage located at http://www.exxonmobilchemical.com/Chem-English/brands/exact-plastomers.aspx?In=productsservices downloaded Jul. 10, 2012", p. 1, Publisher: ExxonMobil Chemical, Published in: US.
Fan, W., et al., "Alternating Stereospecific Copolymerization of Ethylene and Propylene with Metallocene Catalysts", "J. Am. Chem. Soc.", Sep. 8, 2001, pp. 9555-9563, vol. 2001, No. 123, Publisher: Am. Chem. Soc'y, Published in: US.
Fujita, T., et al., "Polymerization of Alkenes", "Comprehensive Organometallic Chemistry III", 2007, pp. 691-734, No. 11.20, Publisher: Elsevier, Ltd.
Goodman, et al., "Stereochemistry of Polymers and Biopolymers", "Polytechnic School of Brooklyn", 1966, p. 27, Publisher: Polymer Research Institute, Published in: US.
Halosource Corporate, "Applications", "Webpage found at http://www.haloshield.com/how/applications downloaded", Aug. 30, 2012, p. 1, Publisher: HaloSource, Inc., Published in: US.
Hartmann, et al., "Specification for related U.S. Appl. No. 12/174,607, filed Jul. 16, 2008", Jul. 16, 2008, p. 71, Published in: US.
Hartmann, et al., "Specificiation for related U.S. Appl. No. 12/174,609, filed Jul. 16, 2008", , p. 68, Published in: US.
Hartmann, Mark, "Declaration of Mark Hartmann Under 37 C.F.R. 1.132", Feb. 11, 2011, p. 10, Published in: US.
Hexion Specialty Chemicals, "Heloxy Modifier 68 Technical Data Sheet", 2005, p. 4, Published in: US.
Hu, Ji, et al., "Study on Phase Change Characteristics of PET-PEG Copolymers", "Journal of Macromolecular Science", Feb. 23, 2006, pp. 615-621, vol. B:Physics, No. 45, Published in: US.
Idemitsu Technofine Co., Ltd., "Specification for Airtechno Fabric" p. 3.
Ivin, K.J., et al., "Olefin Metathesis and Metathesis Polymerization", 1997, p. 184, Publisher: Academic Press, Published in: US.
Masashi, Inoue, "Japanese Office Action re Application No. 2008-552584", dated Jan. 29, 2013, p. 5, Published in: JP.
Yamazaki, T., "Japanese Office Action re Application No. 2011-518770", dated May 29, 2013, p. 9, Published in: JP.
Aoki, et al., "Japanese Office Action re Application No. 2008-552584", dated Oct. 4, 2011, p. 5, Published in: JP.
Neugeboren, Craig, "Reponse to Japanese Office Action re Application No. 2008-552584", dated Apr. 3, 2012, Published in: US.

Koga, Tetsuji, "Response to Japanese Office Action re Application No. 2011-518770", dated Nov. 7, 2013, p. 2, Published in: JP.
Fukui, M., "Japanese Office Action re Application No. 2011-518769", dated Nov. 28, 2013, p. 12, Published in: JP.
Fukui, M., "Japanese Office Action re Application No. 2011-518771", dated Nov. 28, 2013, p. 8, Published in: JP.
Kakuchi, et al., "Chiral Polymers", "Encyclopedia of Polymer Science and Technology", 2009, p. 32, Publisher: John Wiley & Sons, Inc., Published in: US.
Lee, Jae-Woong, "Korean Office Action re Application No. 2008-7020916", dated Apr. 26, 2013, p. 12, Published in: KR.
Kumar, A., "Morphology, Crystallization and Melting Behavior of Statistical Copolymers of Propylene with Ethylene, 1-Butene, 1-Hexen", "Dissertation for Virginia Polytechnic Institute and State University", Jun. 21, 2001, p. 129, Publisher: Va. Poly. Inst., Published in: US.
Neugeboren, Craig, "Response to Office Action re U.S. Appl. No. 11/342,279", dated Feb. 8, 2010, p. 14, Published in: US.
Boyle, Robert C., "Office Action Re U.S. Appl. No. 12/174,607", dated Feb. 14, 2011, p. 17, Published in: US.
Boyle, Robert C., "Office Action re U.S. Appl. No. 12/486,396", dated Feb. 17, 2012, p. 15, Published in: US.
Salvatore, Lynda, "Office Action re U.S. Appl. No. 13/235,676", dated Mar. 4, 2013, p. 10, Published in: US.
Boyle, Robert C., "Office Action re U.S. Appl. No. 12/486,396", dated Mar. 8, 2011, p. 10, Published in: US.
Boyle, Robert C., "Office Action re U.S. Appl. No. 12/174,609", dated Apr. 6, 2011, p. 35, Published in: US.
Salvatore, Lynda, "Office Action re U.S. Appl. No. 12/185,908", dated Apr. 26, 2012, p. 7, Published in: US.
Salvatore, Lynda, "Office Action re U.S. Appl. No. 12/762,119", dated Jun. 10, 2011, p. 29, Published in: US.
Gugliotta, Nicole, "Office Action re U.S. Appl. No. 111/342,279", dated Jun. 11, 2010, p. 28, Published in: US.
Boyle, Robert C., "Office Action re U.S. Appl. No. 12/174,607", dated Jun. 14, 2013, p. 39, Published in: US.
Boyle, Robert C., "Office Action re U.S. Appl. No. 12/174,609", dated Jun. 17, 2013, p. 42, Published in: US.
Boyle, Robert C., "Office Action re U.S. Appl. No. 12/486,396", dated Jul. 2, 2013, p. 25, Published in: US.
Rea, Christine, "Office Action re U.S. Appl. No. 13/040,692", dated Jul. 18, 2013, p. 86, Published in: US.
Gugliotta, Nicole T., "Office Action re U.S. Appl. No. 11/342,279", dated Aug. 6, 2009, p. 18, Published in: US.
Gugliotta, Nicole, "Office Action re U.S. Appl. No. 12/193,296", dated Aug. 8, 2012, p. 23, Published in: US.
Boyle, Robert C., "Office Action re U.S. Appl. No. 12/174,607", dated Aug. 10, 2010, p. 9, Published in: US.
Boyle, Robert C., "Office Action re U.S. Appl. No. 12/174,609", dated Aug. 11, 2010, p. 22, Published in: US.
Salvatore, Lynda, "Office Action re U.S. Appl. No. 12/185,908", dated Aug. 16, 2013, p. 13, Published in: US.
Boyle, Robert C., "Office Action re U.S. Appl. No. 12/486,396", dated Sep. 9, 2011, p. 48, Published in: US.
Gugliotta, Nicole, "Office Action re U.S. Appl. No. 11/342,279", dated Sep. 16, 2011, p. 28, Published in: US.
Gugliotta, Nicole, "Office Action re U.S. Appl. No. 12/193,296", dated Sep. 19, 2011, p. 19, Published in: US.
Mosser, Kathleen M., "Office Action re U.S. Appl. No. 12/908,303", dated Sep. 23, 2011, p. 16, Published in: US.
Salvatore, Lynda, "Office Action re U.S. Appl. No. 13/525,676", dated Sep. 25, 2013, p. 61, Published in: US.
Salvatore, Lynda, "Office Action re U.S. Appl. No. 12/185,908", dated Nov. 8, 2012, p. 36, Published in: US.
Rea, Christine, "Office Action re U.S. Appl. No. 13/040,692", dated Dec. 6, 2012, p. 50, Published in: US.
Boyle, Robert C., "Office Action re U.S. Appl. No. 12/174,607", dated Dec. 13, 2010, p. 2, Published in: US.
Gugliotta, Nicole T., "Office Action re U.S. Appl. No. 11/342,279", dated Dec. 27, 2010, p. 49, Published in: US.
Neugeboren, Craig, "Response to Office Action re U.S. Appl. No. 12/486,396", dated Jan. 9, 2012, p. 8, Published in: US.

(56) References Cited

OTHER PUBLICATIONS

Neugeboren, Craig, "Response to Office Action re U.S. Appl. No. 12/174,609", dated Feb. 11, 2011, p. 20, Published in: US.
Neugeboren, Craig A., "Response to Office Action re U.S. Appl. No. 12/185,908", dated Feb. 11, 2014, p. 15, Published in: US.
Neugeboren, Craig, "Response to Office Action re U.S. Appl. No. 12/193,296", dated Mar. 19, 2012, p. 20, Published in: US.
Neugeboren, Craig, "Response to Office Action re U.S. Appl. No. 12/185,908", dated May 29, 2012, p. 8, Published in: US.
Neugeboren, Craig, "Response to Office Action re U.S. Appl. No. 11/342,279", dated Jun. 23, 2011, p. 11, Published in: US.
Neugeboren, Craig, "Response to Office Action re U.S. Appl. No. 12/174,607", dated Jul. 28, 2011, p. 20, Published in: US.
Neugeboren, Craig, "Response to Office Action re U.S. Appl. No. 12/174,609", dated Aug. 4, 2011, p. 20, Published in: US.
Neugeboren, Craig, "Response to Office Action re U.S. Appl. No. 12/486,396", dated Aug. 5, 2011, p. 2, Published in: US.
Neugeboren, Craig, "Response to Office Action re U.S. Appl. No. 12/486,396", dated Aug. 17, 2012, p. 6, Published in: US.
Gruber, Stephen S., "Reponse to Office Action re U.S. Appl. No. 12/193,296", dated Nov. 8, 2012, p. 8, Published in: US.
Neugeboren, Craig, "Response to office Action re U.S. Appl. No. 12/762,119", dated Nov. 28, 2011, p. 12, Published in: US.
Neugeboren, Craig, "Respcnce to Office Action re U.S. Appl. No. 12/174,607", dated Dec. 9, 2010, p. 7, Published in: US.
Neugeboren, Craig, "Response to Office Action re U.S. Appl. No. 12/174,607", dated Dec. 13, 2011, p. 13, Published in: US.
Neugeboren, Craig, "Response to Office Action re U.S. Appl. No. 12/174,607", dated Dec. 21, 2010, p. 7, Published in: US.
Oakley, G. W., "Solid-State Olefin Metathesis", "Dissertation for the University of Florida", 2004, p. 157 Publisher: U. FLA, Published in: US.
Neugeboren, Craig, "Preliminary Amendment re U.S. Appl. No. 12/193,296", dated Jun. 28, 2011, p. 6, Published in: US.
Young, Lee W., "International Search Report and Written Opinion re Application No. PCT/US07/61081", dated Jul. 21, 2008, p. 12, Published in: PCT.
Nickitas-Etienne, Athina, "International Preliminary Report on Patentability re Application No. PCT/US09/048548", dated Jan. 18, 2011, p. 8, Published in: CH.
Young, Lee W., "Internartional Search Report and Written Opinion re Application No. PCT/US09/48548", dated Oct. 30, 2009, p. 15, Published in: US.
Beijer, Gijsbertus, "International Preliminary Report on Patentability re Application No. PCT/US09/048550", dated Jan. 18, 2011, p. 8, Published in: WO.
Young, Lee W., "International Search Report and Writtion Opinion re Application No. PCT/US09/48550", dated Oct. 8, 2009, p. 10, Published in: US.
Beijer, Gijsbertus, "International Preliminary Report on Patentability re Application No. PCT/US09/048551", dated Jan. 18, 2011, p. 5, Published in: WO.
Young, Lee W., "International Search Report and Written Opinion re Application No. PCT/US09/48551", dated Oct. 8, 2009, p. 12, Published in: US.
Honda, Masashi, "International Preliminary Report on Patentability re Application No. PCT/US09/048555", dated Jan. 18, 2011, p. 6, Published in: WO.
Young, Lee W., "International Search Report and Written Opinion re Application No. PCT/US09/048555", dated Oct. 30, 2009, p. 12, Published in: US.
Honda, Masashi, "International Preliminary Report on Patentability re Application No. PCT/US09/048557", dated Jan. 18, 2011, Published in: WO.
Young, Lee W., "International Search Report and Written Opinion re Application No. PCT/US09/048557", dated Oct. 6, 2009, p. 11, Published in: US.
Nakamura, Yukari, "International Preliminary Report on Patentability re Application No. PCT/US10/058351", , p. 7, Published in: WO.
Young, Lee. W., "International Search Report and Written Opinion re Application No. PCT/US12/25234", dated May 30, 2012, p. 8, Published in: PCT.
Hartmann, M., et al., "Specification for related PCT Patent Application No. PCT/US07/71373 filed", dated Jun. 15, 2012, Published in: PCT.
Wittmann-Regis, Agnes, "International Preliminary Report on Patentability re Application No. PCT/ US2012/025234", dated Feb. 13, 2014, p. 6, Published in: CH.
Meng, Q., et al., "A Temperature-Regulating Fiber made of PEG-Based Smart Copolymer", "Solar Energy Materials & Solar Cells", 2008, pp. 1245-1252, No. 92, Publisher: Elsevier B.V.
Piel, C., "Polymerization of Ethene and Ethene-co-a-Olefin: Investigations on Short- and Long-Chain Branching and Structure-Proper", "Dissertation to the University of Hamburg", 2005, p. 159, Publisher: U. Hamburg, Published in: DE.
Neugeboren, Craig A., "Response to Office Action re U.S. Appl. No. 12/486,396", dated Jan. 2, 2014, p. 8, Published in: US.
Neugeboren, Craig A., "Response to Office Action re U.S. Appl. No. 12/185,908", dated May 1, 2013, p. 15, Published in: US.
Gruber, Stephen S., "Response to Office Action re U.S. Appl. No. 13/040,692", dated May 6, 2013, p. 12, Published in: US.
Neugeboren, Craig A., "Response to Office Action re U.S. Appl. No. 13/525,676", dated Jun. 20, 2013, p. 8, Published in: US.
Gruber, Stephen S., "Response to Office Action re U.S. Appl. No. 13/040,692", dated Sep. 18, 2013, p. 9, Published in: US.
Rhodia PPMC, "Tolonate and Rhodocoat Product Specifications", Jun. 2004, p. 4, Published in: US.
Rojas, G., "ADMET Linear-Low Density Polyethylene: Synthesis, Characterization and Thermal Behavior of Precisely and Irregularly Se", "Dissertation to the University of Florida", 2008, p. 198, Publisher: U. FLA., Published in: US.
Rose, J. M., et al., "Living Polymerization of a-Olefins with an a-Diimine Ni(II) Catalyst: Formation of Well-Defined Ethylene-Propylene Copo", "J. Am. Chem. Soc.", 2006, pp. 4186-4187, vol. 128, No. 13, Publisher: Am. Chem. Soc'y, Published in: US.
Sanitized, "Silica/quat Sanitized T 99-19", "Webpage found at http://www.sanitized.com/en/business-partners/trademark-products/active-ingredients/silicaquat-t-99-19.html downloaded", Aug. 30, 2012, p. 2, Publisher: Sanitized, Published in: US.
Stephens, C.H., et al., "Comparison of Propylene/Ethylene Copolymers Prepared with Different Catalysts", "Published online in Wiley InterScience (www.interscience.wiley.com)", 2006, p. 8, Publisher: Wiley Periodicals, Inc., Published in: US.
Su, J.C., et al., "A Novel Solid-Solid Phase Change Heat Storage Material with Polyurethane Block Copolymer Structure", "Energy Conversion and Management", , pp. 3185-3191, vol. 47, No. (2006), Published in: US.
Sworen, J.C., "Modeling Linear-Low Density Polyethylene: Copolymers Containing Precise Structures", "Dissertation to the University of Florida", 2004, p. 219, Publisher: U. FLA., Published in: US.
Thomson Research Associates, "Adding Value through Antimicrobial Product Protection: Ultra-Fresh—time tested performance", "Webpage located at http://www.ultra-fresh.com/home.php downloaded", Jul. 12, 2012, p. 2 Publisher: Thomson Research Associates, Published in: US.
Vasile, C., et al., "Practical Guide to Polyethylene", 2005, p. 188, Publisher: Rapra Technology Limited, Published in: GB.
Wagner, N.L., et al., "Random Block Copolymers via Segment Interchange Olefins Metathesis", "Macromolecular Rapid Communications", 2008, p. 6, Publisher: Wiley-VCH Verlag GmbH, Published in: US.
Watson, M.D., et al., "Ethylene/Vinyl Acetate Coplolymers via Acyclic Diene Metathesis Polymerization. Examining the Effect of 'Long' Precise", "Macromolecules", Jun. 24, 2000, pp. 5411-5417, vol. 33, No. 15, Publisher: Am. Chem. Soc'y, Published in: US.
Zalba, B., et al., "Review on Thermal Energy Storage with Phase Change: materials, heat transfer analysis, and applications", "Applied Thermal Engineering", , pp. 3185-3191, vol. 23, No. (2003), Published in: US.
Chenggong, Jia, "Chinese Office Action re Application No. 200980132232.X", dated Jun. 13, 2014, p. 15, Published in: CN.

(56) References Cited

OTHER PUBLICATIONS

Chenggong, Jia, "Response to Chinese Office Action re Application No. 20098013054.0", dated Apr. 24, 2014, p. 6, Published in: CN.
Hollender, C., "European Search Report re Application No. 09798539", dated Jun. 5, 2014, p. 4, Published in: EP.
Hollender, C., "Extended European Seach Report re Appl. No. PCT/US2009/048551", dated Jun. 5, 2014, p. 8, Published in: EP.
Holldender, C., "Extended European Search Report re Application No. PCT/US2009/048555", dated Jun. 25, 2014, p. 8, Published in: EP.
Hayashi, Yasushi, "Japanese Office Action re Application No. 2011-508662", dated Mar. 11, 2014, p. 8, Published in: JP.
Koga, Tetsuji, "Response to Japanese Office Action re Application No. 2011-518769", dated Jun. 3, 2014, p. 14, Published in: JP.
Boyle, Robert C., "Office Action re U.S. Appl. No. 12/486,396", dated Feb. 27, 2014, p. 19, Published in: US.
Salvatore, Lynda, "Office Action re U.S. Appl. No. 12/185,908", dated Jun. 9, 2014, p. 50, Published in: US.
Salvatore, Lynda, "Office Action re U.S. Appl. No. 13/525,676", dated Jul. 17, 2014, p. 14, Published in: US.
Neugeboren, Craig A., "Response to Office Action re U.S. Appl. No. 13/525,676", dated Feb. 25, 2014, p. 10, Published in: US.
Zonghua, Ren, "Chinese Office Action re Application No. 201080066869.6", dated Jul. 1, 2014, p. 13, Published in: CN.
Chenggong, Jia, "Chinese Office Action re Application No. 200980132054.0", dated Aug. 7, 2014, p. 7, Published in: CN.
Xiaowei, Gao, "Chinese Office Action re Application No. 201080066869.6", dated May 11, 2015, p. 10, Published in: CN.
Haiqing, Li, "Chinese Office Action re Application No. 201210440162.8", dated Sep. 16, 2014, p. 12, Published in: CN.
Huang, Shuhui, "Response to Chinese Office Action re Application No. 2012104401628", dated Mar. 31, 2015, p. 8, Published in: CN.
Matsunami, Yumiko, "Japanese Office Action re Application No. 2011-518769", dated Jan. 27, 2015, p. 10, Published in: JP.
Ieki, Masami, "Japanese Office Action re Application No. 2013-161059", dated Jul. 29, 2014, p. 6, Published in: JP.
Miyazaki, Daisuke, "Japanese Office Action re Application No. 2013-086016", dated Aug. 5, 2014, p. 6, Published in: JP.
Ichinomiya, Rie, "Japanese Office Action re Application No. 2008-500731", dated Sep. 10, 2013, p. 4, Published in: JP.
Kawano, Ryuchiro, "Japanese Office Action re Application No. 2013-504882", dated Nov. 18, 2014, p. 6, Published in: JP.
Nakamura, Yusuke, "Japanese Office Action re Application No. 2012-539986", dated Dec. 2, 2014, p. 10, Published in: JP.
Seiwa, "Response to Japanese Office Action re Application No. 2013-086016", dated Feb. 4, 2015, p. 4, Published in: JP.
Seiwa, "Response to Japanese Office Action re Application No. 2014-003397", dated May 28, 2015, p. 3, Published in: JP.
Lee, Jae-Woong, "Korean Office Action re Application No. 2013-7027992", dated Feb. 6, 2014, p. 13, Published in: KR.
Lee, Geun-Wan, "Korean Office Action re Application No. 2014-7016979", dated Feb. 13, 2015, p. 10, Published in: KR.
Geun-Wan, Lee, "Korean Office Action re Application No. 2014-7016979", dated Aug. 14, 2014, p. 5, Published in: KR.
Mulcahy, Peter D., "Office Action re U.S. Appl. No. 11/078,656", dated Jan. 5, 2012, p. 12, Published in: US.
Mulcahy, Peter D., "Office Action re U.S. Appl. No. 11/078,656", dated Mar. 29, 2013, p. 25, Published in: US.
Mulcahy, Peter D., "Office Action re U.S. Appl. No. 11/078,656", dated Mar. 31, 2014, p. 31, Published in: US.
Gugliotta, Nicole T., "Office Action re U.S. Appl. No. 13/779,035", dated Jun. 1, 2015, p. 9, Published in: US.
Mulcahy, Peter D., "Office Action re U.S. Appl. No. 11/078,656", dated Jun. 13, 2012, p. 19, Published in: US.
Mulcahy, Peter D, "Office Action re U.S. Appl. No. 11/078,656", dated Sep. 27, 2011, p. 19, Published in: US.
Neugeboren, Craig A., "Response to Office Action re U.S. Appl. No. 11/078,656", dated Mar. 2, 2012, p. 11, Published in: US.
Gruber, Stephen S., "Response to Office Action re U.S. Appl. No. 11/078,656", dated Jul. 30, 2013, p. 18, Published in: US.
Gruber, Stephen S., "Response to Office Action re U.S. Appl. No. 11/078,656", dated Oct. 15, 2012, p. 15, Published in: US.
Gruber, Stephen S., "Response Office Action re U.S. Appl. No. 11/078,656", dated Dec. 12, 2013, p. 8, Published in: US.
Neugeboren, Craig A., "Response to Office Action re U.S. Appl. No. 11/078,656", dated Dec. 19, 2011, p. 11, Published in: US.
Markfort, Iris-Anne Lucie, "Extended European Search Report re Appl. No. 12754849.3", dated Jul. 21, 2015, p. 7, Published in: EP.
Zonghua, Ren, "CN Office Action re Application No. 2012800116365", dated May 15, 2015, p. 16, Published in: CN.
Zonghua, Ren, "CN Office Action re Application No. 2012800116365", dated Nov. 20, 2015, p. 10, Published in: CN.
Huang, Shuhui, "CN Respone to Office Action re Application No. 2012800116365", dated Sep. 30, 2015, p. 9, Published in: CN.
Kishi, Susumu, "JP Office Action re Application No. 2013556644", dated Nov. 17, 2015, p. 8, Published in: JP.
Smith, J.A. et al, "Precisely controlled methyl branching in polyethylene via acyclic diene metathesis (ADMET) polymerization", "Macromolecules", Jan. 2000, pp. 3781-3794, vol. 33, No. 10, Publisher: American chemical Society, Published in: US.
O'Gara, J.E. et al, "Acyclic diene metathesis (ADMET) polymerization. Synthesis of perfectly linear polyethylene", "Makromolekulare Chemie", pp. 657-662, vol. 14, No. 10, Publisher: Huthig and Wepf Verlag, Published in: CH.
Simeon, Magrizo, "European Office Action re Application No. 127548493-1303", dated Feb. 19, 2016, p. 5, Published in: EP.
Markfort, Iris-Anne, "Response to European Office Action re Application No. 12754849.3-1303", Jan. 21, 2016, p. 6, Published in: EP.
Kishi, Susumu, "Response to Japanese Office Action re Application No. 2013556644", dated Feb. 5, 2016, p. 8, Published in: JP.
Yuwei, Wang, "Response to Chinese Office Action re Application No. 201280011636.5", dated Feb. 5, 2016, p. 14, Published in: CN.
Zonghua, Ren, "Response to Chinese Office Action re Application No. 201280011636.5", dated Sep. 29, 2015, p. 10, Published in: CN.
Wenshan, Guo, "Chinese Office Action re Application No. 201280011636.5", dated Mar. 24, 2016, p. 8, Published in: CN.
Huang, Shuhui, "Response to Chinese Office Action re Application No. 201280011636.5", dated Apr. 21, 2016, p. 9, Published in: CN.
Hartmann, et al., "Specification of U.S. Appl. No. 11/078,656", Mar. 11, 2005, p. 41, Published in: US.
Hartmann, et al., "Specification of U.S. Appl. No. 12/174,607", Jul. 16, 2008, p. 55, Published in: US.
Hartmann, et al., "Specification of U.S. Appl. No. 12/174,609", Jul. 16, 2008, p. 53, Published in: US.
Hartmann, et al., "Specification of U.S. Appl. No. 12/185,908", Aug. 5, 2008, p. 44, Published in: US.
Hartmann, et al., "Specification of U.S. Appl. No. 13/040,692", Mar. 4, 2011, p. 64, Published in: US.
Aldrich Chemical Co., "Olefin Metathesis", "ChemFiles", 2009, p. 12 vol. 9, No. 6, Publisher: sigma-adrich.com, Published in: US.
Atiqullah, M., et al., "Synthesis of Functional Polyolefins using Metallocenes: A Comprehensive Review", "Polymer Reviews, downloaded Aug. 30, 2012", Apr. 19, 2010, pp. 178-230, vol. 50, No. 2, Publisher: King Fahd University of Petroleum & Minerals, Published in: US.
BASF, Inc., "Specification Sheet for Laromer Grades", Sep. 2007, p. 4, Published in: US.
Baughman, T.W., "Functionalized Ethylene Copolymers and Materials Via Olefin Metathesis Polymerization", "Dissertation to the University of Florida", 2006, p. 204, Publisher: U. FLA., Published in: US.
Fujishiro, Ryo, "Japanese Office Action Re Application No. 2016-071506", dated Nov. 22, 2016, p. 5, Published in: JP.
Simeon, Magrizo, "European Office Action re Application No. 12754849.3", dated Aug. 12, 2016, p. 4, Published in: EP.
Magrizo, Simeon, "European Office Action Re Application No. 12754849.3", dated Feb. 10, 2017, p. 3, Published in: EP.
Magrizo, Simeon, "European Examination Report Re Application No. 12754849.3", dated Aug. 18, 2017, p. 3, Published in: EP.
Lee, Myung-Sun, "Korean Office Action Re Application No. 10-2013-7025938", dated Sep. 20, 2017, pp. 12, Published in: KR.

(56) References Cited

OTHER PUBLICATIONS

Zing, Ji, "Chinese Office Action Re Application No. 201610622414.7", Nov. 23, 2017, pp. 11, Published in: CN.

* cited by examiner

R₁ = OH or OCH₃

R₁ = OH or OCH₃

Polymeric PCM with reactive endgroups

R〰〰〰〰〰〰〰〰〰〰〰〰〰〰〰〰〰〰〰〰R$_1$

R = any textile reactive functional group, R$_1$ = can be same as R or H

Fig.3

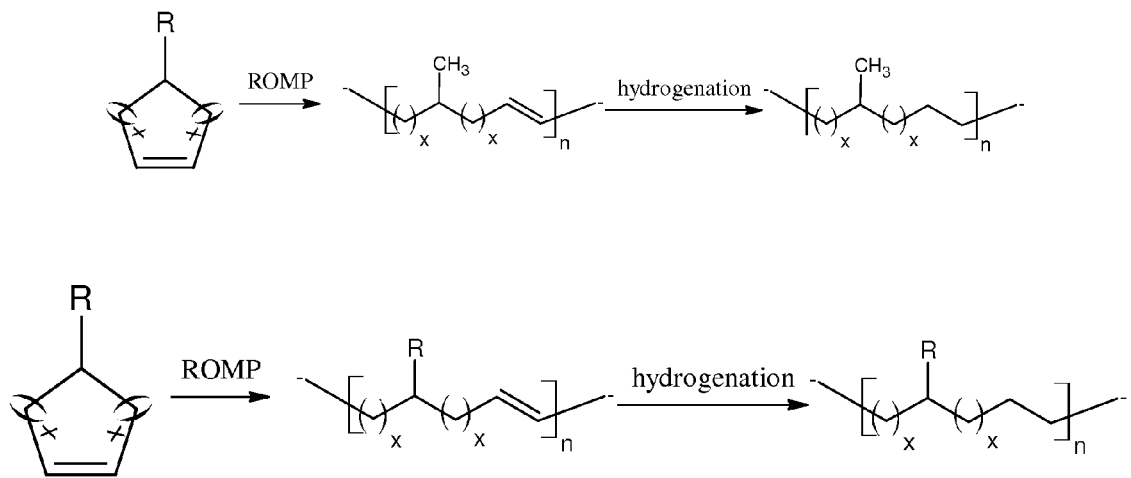
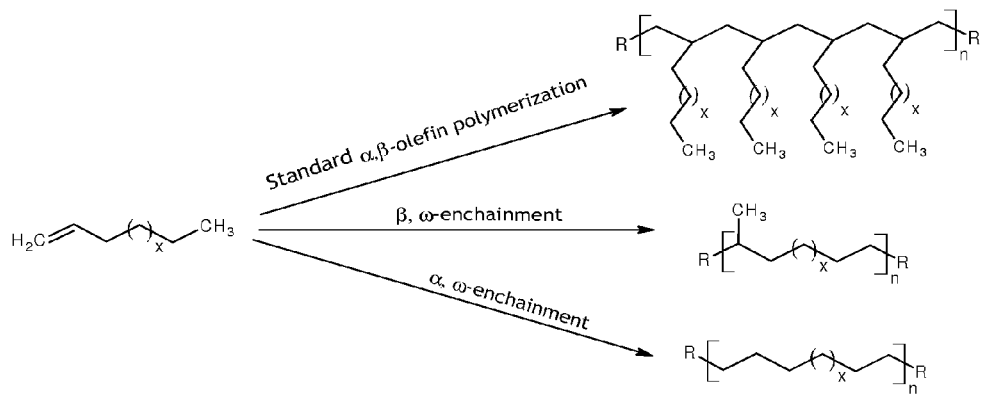
Fig. 14
Fig. 15

ARTICLES CONTAINING PRECISELY BRANCHED FUNCTIONAL POLYMERIC PHASE CHANGE MATERIALS

RELATED APPLICATIONS

The present application claims the benefit of U.S. patent application Ser. No. 13/040,692, entitled, "ARTICLES CONTAINING PRECISELY BRANCHED FUNCTIONAL POLYMERIC PHASE CHANGE MATERIALS" and filed on Mar. 4, 2011. The details of this application are incorporated herein by reference in their entirety. Additionally, this application is related to commonly owned and assigned U.S. patent application Ser. No. 12/174,607, entitled Functional Polymeric Phase Change Materials and Methods of Manufacturing the Same, filed on Jul. 16, 2008, U.S. patent application Ser. No. 12/174,609, entitled Functional Polymeric Phase Change Materials, filed on Jul. 16, 2008, and U.S. patent application Ser. No. 12/185,908, entitled Functional Polymeric Phase Change Materials, filed on Aug. 5, 2008. The details of these applications are incorporated herein by reference in their entirety.

FIELD OF THE INVENTION

In general, the present invention relates to articles containing polymeric phase change materials and functionally reactive polymeric phase change materials that are based on precisely branched polymers.

BACKGROUND OF THE INVENTION

The modification of textiles to provide temperature regulating properties through the generalized use of phase change materials (PCMs) is known. The use of microencapsulated PCM (mPCM), their methods of manufacture and applications thereof have also been widely disclosed. For example, the following references all use microcapsules in their application:
 1. U.S. Pat. No. 5,366,801—Fabric with Reversible Enhanced Thermal Properties
 2. WO0212607—Thermal Control Nonwoven
 3. U.S. Pat. No. 6,517,648—Process for Preparing a Non-Woven Fibrous Web
 4. JP05-156570—Fibrous Structure having Heat Storage Ability and its Production
 5. US20040029472—Method and compound fabric with latent heat effect
 6. US20040026659—Composition for Fabricating Phase-Change Material Microcapsules and a Method for Fabricating the Microcapsules
 7. US20040044128—Method and Microcapsule Compound Waterborne Polyurethane
 8. US2004011989—Fabric Coating Composition with Latent Heat Effect and Method for Fabricating the Same
 9. US20020009473—Microcapsule, Method for its Production, Use of same, and Coating Liquid with Such
 10. JP11350240—Production of Fiber having Adhered Microcapsule on Surface
 11. JP2003-268679—Yarn having Heat Storage Property and Woven Fabric using the same.

Microcapsules, however, are expensive, can rupture, need additional resinous binders for adhesion, and can cause poor fabric flexibility and properties.

Numerous other disclosures outline the development of temperature regulating textiles by first manufacturing a fiber that contains a PCM or mPCM. For example, the following all disclose compositions, methods of manufacture, processes, and fabrics created from synthetically manufactured fibers. While this might be acceptable in some circumstances, the applications disclosed below omit all of the natural cellulosic and proteinaceous fibers and fabrics such as cotton, flax, leather, wool, silk, and fur. They also do not allow for the post treatment of synthetic fibers or fabrics.
 12. US20030035951—Multi-Component Fibers having Enhanced Reversible Thermal Properties and Methods of Manufacturing Thereof.
 13. U.S. Pat. No. 4,756,958—Fiber with Reversible Enhance Thermal Storage Properties and Fabrics made there from.
 14. JP5331754—Heat Absorbing and Releasing Nonwoven Fabric of Conjugate Fiber
 15. JP6041818—Endothermic and Exothermic Conjugate Fiber
 16. JP5239716—Thermally Insulating Conjugate Fiber
 17. JP8311716—Endothermic and Exothermic Conjugate Fiber
 18. JP5005215—Endothermic and Exothermic Conjugate Fiber
 19. JP2003027337—Conjugate Fiber Having Heat-Storing and Heat-Retaining Property
 20. JP07-053917—Heat-Accumulating and Heat-Insulating Fiber
 21. JP2003-293223—Endothermic Conjugate Fiber
 22. JP02289916—Thermal Storage Fiber
 23. JP03326189—Fiber with Heat Storage Ability
 24. JP04-219349—Heat Storage Composition
 25. JP06-234840—Heat Storage Material
 26. JP Appl. #2001-126109—Heat Storage Fiber, Method of Producing the same, and Heat Storage Cloth Material
 27. JP03352078—Heat Storage Material
 28. JP04-048005—Fabric Product with Heat Storing Ability
 29. WO0125511—Thermal Energy Storage Materials
 30. JP02317329—Heat Storage Fiber-Method for Producing the same and Heat Storage Cloth Material
 31. WO2004007631—Heat-Storage Material, Composition Therefore, and uses of these
 32. JP2003-268358—Heat-Storage Material use around Body
 33. JP2004-011032—Temperature-Controllable Fiber and Fabric
 34. JP2004-003087—Heat Storable Composite Fiber and Cloth Material having Heat-Storing Properties
 35. JP06200417—Conjugate Fiber Containing Heat-Accumulation Material and its Production
 36. CN1317602—Automatic Temp-Regulating Fibre and its Products
 37. U.S. Pat. No. 5,885,475—Phase Change Materials Incorporated throughout the Structure of Polymer Fibers In addition, U.S. Pat. Nos. 4,851,291, 4,871,615, 4,908, 238, and 5,897,952 disclose the addition of polyethylene glycol (PEG), polyhydric alcohol crystals, or hydrated salt PCM to hollow and non-hollow fibers. The fibers can be natural or synthetic, cellulosic, protein based, or synthetic hydrocarbon based. The non-hollow fibers have PEG materials deposited or reacted on the surface to act like PCM. These are problematic in that they are very hydrophilic causing excessive moisture absorption problems, and wash durability problems. There is no known disclosure of the use of acrylic, methacrylic polymers or other hydrophobic polymeric PCMs for these applications.

U.S. Pat. No. 6,004,662 mentions the use of acrylate and methacrylate polymers with C16 to C18 alkyl side chains as PCMs but not as unencapsulated or functionalized or reacted to the surface of fibrous textiles.

U.S. Pat. Nos. 4,259,198 and 4,181,643 disclose the use of crystalline crosslinked synthetic resin selected from the group of epoxide resins, polyurethane resins, polyester resins and mixtures thereof which contain, as crystallite forming blocks, segments of long-chain dicarboxylic acids or diols as PCMs, but not in conjunction with fibers or textiles.

Specific fiber and textile treatments or finishes in which specific compounds are reacted onto the substrate to provide some thermal change (usually based on moisture) have been disclosed. These systems are not based on long side chain alkyl, or long chain glycol acrylates or methacrylates that undergo a thermal phase change to provide improved latent heat effects. Examples include:

38. JP2003-020568—Endothermic Treating Agent for Fiber Material
39. JP2002-348780—Hygroscopic and Exothermic Cellulose-Based Fiber
40. JP2001-172866—Hygroscopic and Exothermic Cellulose-Based Fiber Product having Excellent Heat Retaining Property
41. JP11-247069—Warm Retainable Exothermic Cloth Various disclosures describe the use of acrylic or methacrylic copolymers containing long chain alkyl moieties for textile finishes but only for properties such as grease repellency, soil resistance, permanent press properties, and quickness of drying. They do not disclose or mention the use of high purity polymers as PCMs, latent heat storage treatments or textile finishes which can impart temperature regulation and improved comfort. More specifically, they do not disclose advantageous polymer architecture such as mol. wt., mol. wt. distribution or specific copolymer architecture. Example include:

42. U.S. Pat. No. 6,679,924—Dye fixatives
43. U.S. Pat. No. 6,617,268—Method for protecting cotton from enzymatic attack by cellulase enzymes
44. U.S. Pat. No. 6,617,267—Modified textile and other materials and methods for their preparation
45. U.S. Pat. No. 6,607,994—Nanoparticle-based permanent treatments for textiles
46. U.S. Pat. No. 6,607,564—Modified textiles and other materials and methods for their preparation
47. U.S. Pat. No. 6,599,327—Modified textiles and other materials and methods for their preparation
48. U.S. Pat. No. 6,544,594—Water-repellent and soil-resistant finish for textiles
49. U.S. Pat. No. 6,517,933—Hybrid polymer materials
50. U.S. Pat. No. 6,497,733—Dye fixatives
51. U.S. Pat. No. 6,497,732—Fiber-reactive polymeric dyes
52. U.S. Pat. No. 6,485,530—Modified textile and other materials and methods for their preparation
53. U.S. Pat. No. 6,472,476—Oil- and water-repellent finishes for textiles
54. U.S. Pat. No. 6,387,492—Hollow polymeric fibers
55. U.S. Pat. No. 6,380,336—Copolymers and oil- and water-repellent compositions containing them
56. U.S. Pat. No. 6,379,753—Modified textile and other materials and methods for their preparation
57. US20040058006—High affinity nanoparticles
58. US20040055093—Composite fibrous substrates having protein sheaths
59. US20040048541—Composite fibrous substrates having carbohydrate sheaths
60. US20030145397—Dye fixatives
61. US20030104134—Water-repellent and soil-resistant finish for textiles
62. US20030101522—Water-repellent and soil-resistant finish for textiles
63. US20030101518—Hydrophilic finish for fibrous substrates
64. US20030079302—Fiber-reactive polymeric dyes
65. US20030051295—Modified textiles and other materials and methods for their preparation
66. US20030013369—Nanoparticle-based permanent treatments for textiles
67. US20030008078—Oil- and water-repellent finishes for textiles
68. US20020190408—Morphology trapping and materials suitable for use therewith
69. US20020189024—Modified textiles and other materials and methods for their preparation
70. US20020160675—Durable finishes for textiles
71. US20020155771—Modified textile and other materials and methods for their preparation
72. US20020152560—Modified textiles and other materials and methods for their preparation
73. US20020122890—Water-repellent and soil-resistant finish for textiles
74. US20020120988—Abrasion- and wrinkle-resistant finish for textiles Although present compositions and methods are functional, they do not take advantage of the unique nature and functional aspects that accompanies the use of polymeric materials for the phase change material.

Polymers made with short chain, low molecular weight alkenes (olefins) are well known and used extensively. For example, polyethylene and polypropylene made from alkene monomers such as ethylene and propylene are well known as are copolymers of these monomers along with other alkene and other unstaturated monomers. In addition, one or more variations of the following polymers are known: Products from Dow Chemical Company such as the Affinity® and Engage® polymers (ethylene-octene copolymers); Versify® copolymers based on Ethylene-Propylene; Vistamaxx® products based on Ethylene-Propylene along with their Exact® copolymers based on Ethylene-Octene; other ethylene copolymers such as the Elvax® products based ethylene-vinyl acetate; Elvaloy® AC based on ethylene copolymerized with methyl, ethyl or butyl acrylate; and Nucrel® resins which are ethylene-methacrylic acid copolymers. These are all well-known commercial polymers in which the monomers have a random distribution in the chain.

Also available are other monomers with unsaturation that can be copolymerized with ethylene, for example, alkene monomers such as propene, butene, pentene, hexene, octene, decene, dodecene, isoprene, butadiene, or any other alkene functional compound and its isomers, alkenes with single or multiple unsaturations and their isomers, halogenated alkenes, reactive functional group alkenes with reactive functionality such as acids, alcohols, esters, ketones, aldehydes, ethers, epoxides, amides, and the other functionalities described below, cyclic alkenes with single or multiple unsaturations and their isomers, acrylic or methacrylic monomers and their isomers, non-functional, functional and reactive functional monomers, vinyl monomers such as vinyl ethers, vinyl esters, vinyl amides, halogenated vinyls, styrene, maleic anhydride, maleic acid, itaconic acid, itaconic anhydride, etc. and their isomers. These polymers and copolymers can be polymerized by a number of methods using such catalysts as Zeigler-Natta, free radical, and metallocene catalysts/initiators.

These catalysts do produce polymers and the catalysts themselves may be tailored to control the molecular weight of the polymer, the amount of branching in the polymer, the length of the branches in the polymer, the incorporation of comonomers and functional comonomers, the stereochemistry and chirality (atactic, isotactic or syndiotactic) of the polymer branches and its pendant groups, and the functionalization of the polymer chain ends.

U.S. Pat. Nos. 5,969,070, 6,566,544, 6,787,624, 7,119,154, 7,268,243, 7,300,994, 7,560,523, and 7,790,810, and US Patent Application Nos. 20070049714, 20080214854, 20090192278, 20100036077 and 20100029882 disclose various catalysts, polymers and stereochemistry of the polymers. However, none of this art discloses the aspects relating to precisely branched polymers disclosed herein, and particularly when used in conjunction with the temperature regulating material aspects that are disclosed herein.

SUMMARY OF THE INVENTION

Exemplary embodiments are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In accordance with one aspect a temperature regulating article comprises a substrate and a polymeric phase change material bound to the substrate, wherein the polymeric phase change material is characterized by including a precisely branched polymer with substantially equally spaced repeating sidechains.

In other embodiments the polymeric phase change material includes between 20 and 200 branches per 1000 carbon units, has a latent heat of at least 5 Joules per gram, and a transition temperature between 0° C. and 40° C.

In accordance with another aspect a temperature regulating composition comprises a polymeric phase change material wherein the polymeric phase change material is characterized by including a precisely branched polymer with substantially equally spaced repeating sidechains. In other embodiments, the polymeric phase change material includes between 20 and 200 branches per 1000 carbon units, has a latent heat of at least 5 Joules per gram, and a transition temperature between 0° C. and 40° C.

Many additional aspects and embodiments are described herein as would be recognized by one of ordinary skill in the art.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 3 shows a representative example of an FP-PCM based on a crystallizable backbone polymer such as polyesters, polyethers, polyurethanes, polyamides, polyimides, polyacetals, polysulfides, polysulfones, etc where R=reactive functional groups on one end of the polymer chain;

FIG. 14 is a diagram expression of ring-opening metathesis polymerization.

FIG. 15 is a diagram expression of controlled β-hydride elimination/reinsertion.

Figure 1:
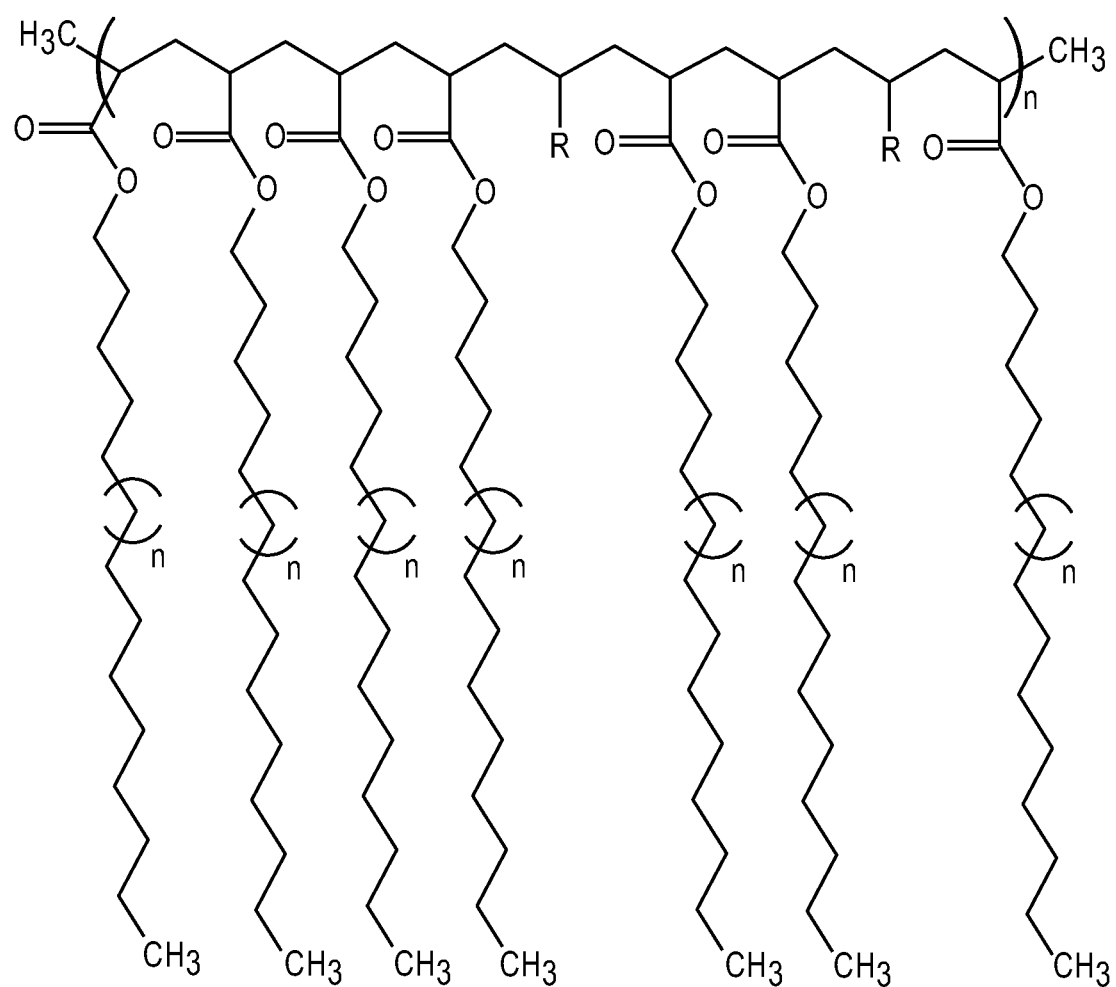
FIGS. 1 and 2 show representative examples of functional polymeric phase change materials (FP-PCMs) based on a (meth)acrylate backbone with crystallizable side chains based on long chain alky groups or long chain ether groups respectively where R=reactive functional groups.
Figure 1A:
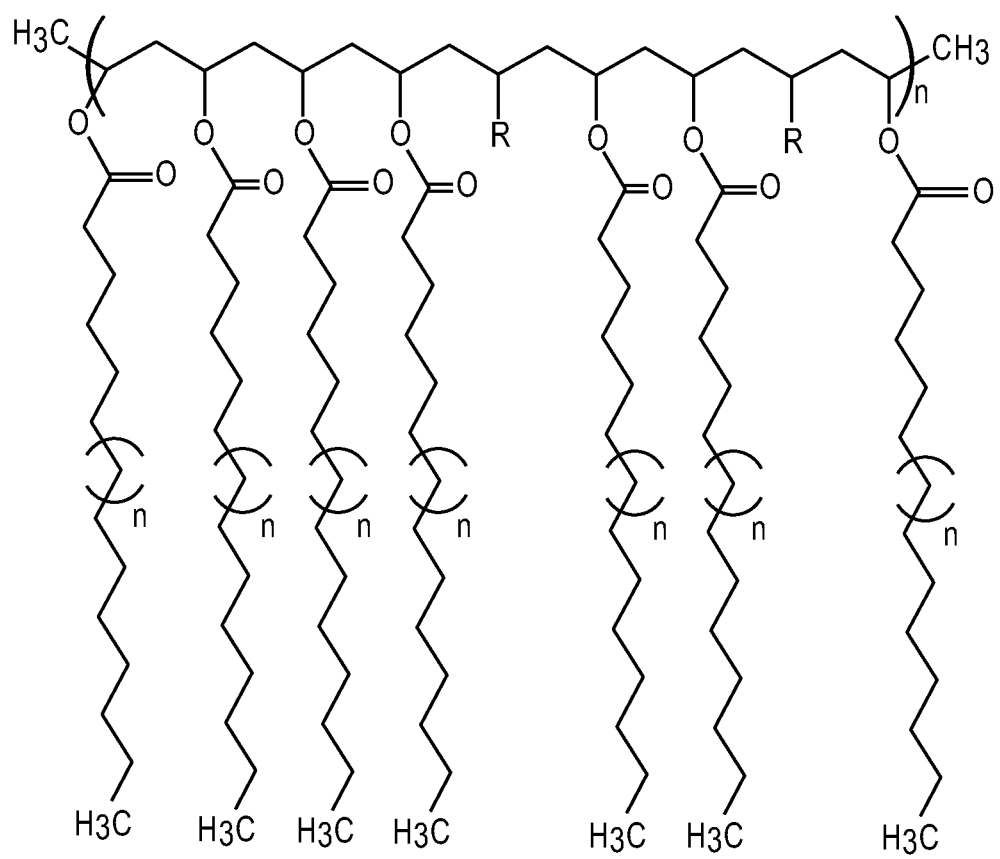
FIGS. 1a and 2a show representative examples of FP-PCMs based on a vinyl ester backbone with crystallizable side chains based on long chain alky groups or long chain ether groups respectively where R=reactive functional groups.
Figure 1B:
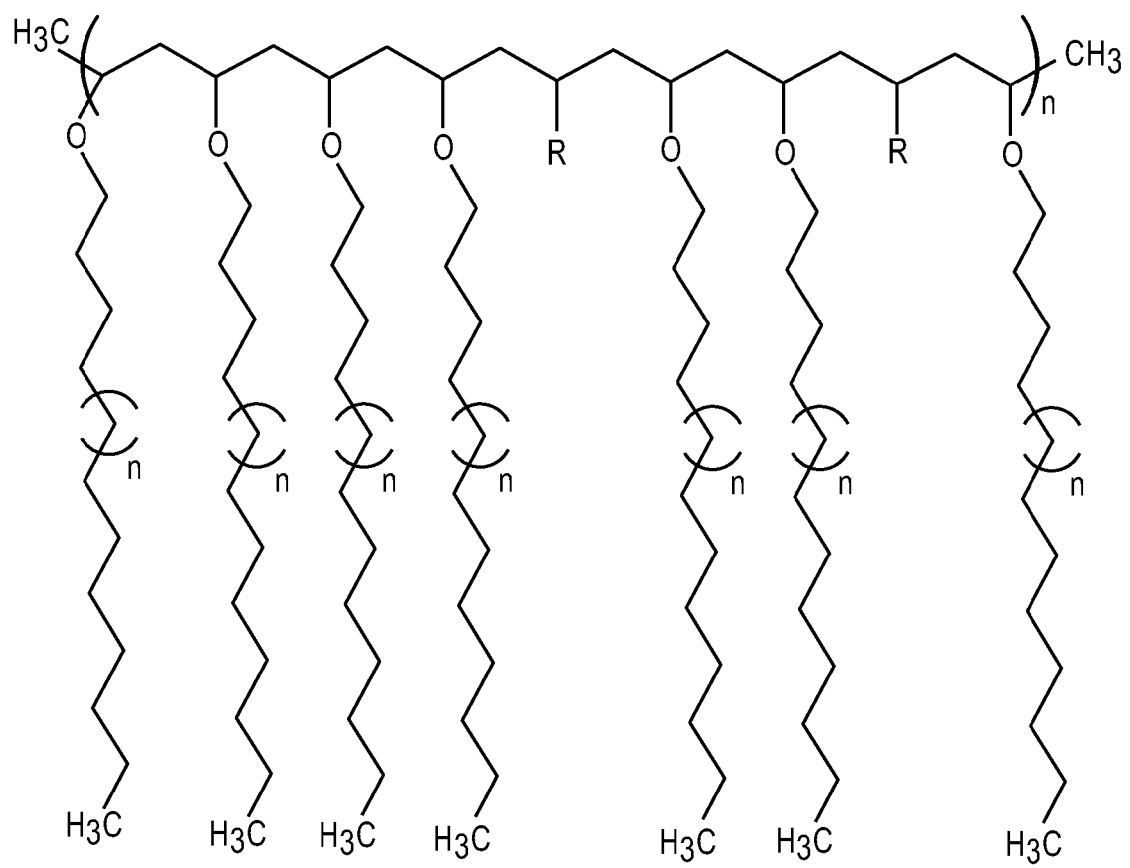
FIGS. 1b and 2b show representative examples of FP-PCMs based on a vinyl ether backbone with crystallizable side chains based on long chain alky groups or long chain ether groups respectively where R=reactive functional groups.
Figure 1C:
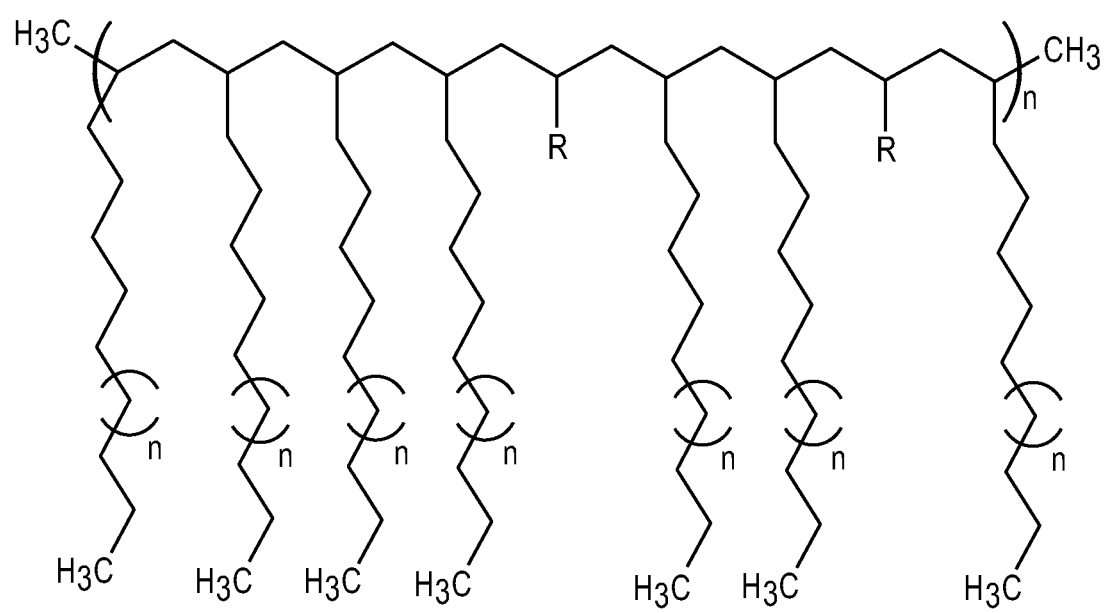
FIG. 1c shows a representative example of an FP-PCM based on a polyolefin backbone with crystallizable side chains based on long chain alky groups where R=reactive functional groups.

Other embodiments and aspects are disclosed herein, including various figures and process descriptions described and illustrated throughout the specification.

DETAILED DESCRIPTION

Throughout this specification references are made to the use of various materials, combinations, chemical formulations and other aspects that may be used in various combinations to form one or more materials, end products, fibers, fabrics or compositions in accordance with aspects of the present invention. It should be understood, both to one of skill in the art as well as the examining divisions in the United States Patent Office and Patent Offices throughout the world, that each of the lists of materials, examples, and other embodiments are included herein in order to teach one of skill in the art that they may be combined into various alternative embodiments, without requiring specific claim permutations of these individual features. The claims as presented herein, as well as any potential future amendments to those claims, may include one or more combinations of these materials, ranges and other alternatives without departing from the spirit and scope of the invention described herein. In particular it is contemplated that one of skill in the art would recognize and find adequate support in the written description for any combination of the features disclosed herein, whether described in a single example or embodiment, or described in different sections of the written description. The description of these various examples and options is specifically drafted to comply with 35 U.S.C. § 112 of the United States Patent Laws, Article 123(2) of the European Patent Laws as well as other similar national country laws relating to the adequacy of the written description.

It should be clearly understood that by providing examples of specific compositions and methods in the later part of this description, applicant does not intend to limit the scope of the claims to any of those specific composition. To the contrary, it is anticipated that any combination of the functional groups, polymeric phase change materials, and articles described herein may be utilized to achieve the novel aspects of the present invention. The claims are not intended to be limited to any of the specific compounds described in this disclosure or any disclosure incorporated herein.

Definitions—The following definitions apply to various elements described with respect to various aspects of the invention. These definitions may likewise be expanded upon herein.

As used herein, the term "monodisperse" refers to being substantially uniform with respect to a set of properties. Thus, for example, a set of microcapsules that are monodisperse can refer to such microcapsules that have a narrow distribution of sizes around a mode of the distribution of sizes, such as a mean of the distribution of sizes. A further example is a set of polymer molecules with similar molecular weights.

As used herein, the term "latent heat" refers to an amount of heat absorbed or released by a material as it undergoes a transition between two states. Thus, for example, a latent heat can refer to an amount of heat that is absorbed or released as a material undergoes a transition between a liquid state and a crystalline solid state, a liquid state and a gaseous state, a crystalline solid state and a gaseous state, two crystalline solid states or crystalline state and amorphous state.

As used herein, the term "transition temperature" refers to an approximate temperature at which a material undergoes a transition between two states. Thus, for example, a transition temperature can refer to a temperature at which a material undergoes a transition between a liquid state and a crystalline solid state, a liquid state and a gaseous state, a crystalline solid state and a gaseous state, two crystalline solid states or crystalline state and amorphous state. A temperature at which an amorphous material undergoes a transition between a glassy state and a rubbery state may also be referred to as a "glass transition temperature" of the material.

As used herein, the term "phase change material" refers to a material that has the capability of absorbing or releasing heat to adjust heat transfer at or within a temperature stabilizing range. A temperature stabilizing range can include a specific transition temperature or a range of transition temperatures. In some instances, a phase change material can be capable of inhibiting heat transfer during a period of time when the phase change material is absorbing or releasing heat, typically as the phase change material undergoes a transition between two states. This action is typically transient and will occur until a latent heat of the phase change material is absorbed or released during a heating or cooling process. Heat can be stored or removed from a phase change material, and the phase change material typically can be effectively recharged by a source emitting or absorbing it. For certain implementations, a phase change material can be a mixture of two or more materials. By selecting two or more different materials and forming a mixture, a temperature stabilizing range can be adjusted for any desired application. The resulting mixture can exhibit two or more different transition temperatures or a single modified transition temperature when incorporated in the articles described herein.

As used herein, the term "polymer" refers to a material that includes a set of macromolecules. Macromolecules included in a polymer can be the same or can differ from one another in some fashion. A macromolecule can have any of a variety of skeletal structures, and can include one or more types of monomeric units. In particular, a macromolecule can have a skeletal structure that is linear or non-linear. Examples of non-linear skeletal structures include branched skeletal structures, such those that are star branched, comb branched, or dendritic branched, and network skeletal structures. A macromolecule included in a homopolymer typically includes one type of monomeric unit, while a macromolecule included in a copolymer typically includes two or more types of monomeric units. Examples of copolymers include statistical copolymers, random copolymers, alternating copolymers, periodic copolymers, block copolymers, radial copolymers, and graft copolymers. In some instances, a reactivity and a functionality of a polymer can be altered by addition of a set of functional groups, such as acid anhydride groups, amino groups and their salts, N-substituted amino groups, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. Such functional groups can be added at various places along the polymer, such as randomly or regularly dispersed along the polymer, at ends of the polymer, on the side, end or any position on the crystallizable side chains, attached as separate dangling side groups of the polymer, or attached directly to a backbone of the polymer. Also, a polymer can be capable of cross-linking, entanglement, or hydrogen bonding in order to increase its mechanical strength or its resistance to degradation under ambient or processing conditions. As can be appreciated, a polymer can be provided in a variety of forms having different molecular weights, since a molecular weight of the polymer can be dependent upon processing conditions used for forming the polymer. Accordingly, a polymer can be referred to as having a specific molecular weight or a range of molecular weights. As used herein with reference to a polymer, the term "molecular weight" can refer to a number average molecular weight, a weight average molecular weight, or a melt index of the polymer.

Examples of polymers (including those polymers used for crosslinkers and binders) include polyhydroxyalkonates, polyamides, polyamines, polyimides, polyacrylics (e.g., polyacrylamide, polyacrylonitrile, and esters of methacrylic acid and acrylic acid), polycarbonates (e.g., polybisphenol A carbonate and polypropylene carbonate), polydienes (e.g., polybutadiene, polyisoprene, and polynorbornene), polyepoxides, polyesters (e.g., polycaprolactone, polyethylene adipate, polybutylene adipate, polypropylene succinate, polyesters based on terephthalic acid, and polyesters based on phthalic acid), polyethers (e.g., polyethylene glycol or polyethylene oxide, polybutylene glycol, polypropylene oxide, polyoxymethylene or paraformaldehyde, polytetramethylene ether or polytetrahydrofuran, and polyepichlorohydrin), polyfluorocarbons, formaldehyde polymers (e.g., urea-formaldehyde, melamine-formaldehyde, and phenol formaldehyde), natural polymers (e.g., polysaccharides, such as cellulose, chitan, chitosan, and starch; lignins; proteins; and waxes), polyolefins (e.g., polyethylene, polypropylene, polybutylene, polybutene, and polyoctene), polyphenylenes, silicon-containing polymers (e.g., polydimethyl siloxane and polycarbomethyl silane), polyurethanes, polyvinyls (e.g., polyvinyl butyral, polyvinyl alcohol, esters and ethers of polyvinyl alcohol, polyvinyl acetate, polystyrene, polymethylstyrene, polyvinyl chloride, polyvinyl pyrrolidone, polymethyl vinyl ether, polyethyl vinyl ether, and polyvinyl methyl ketone), polyacetals, polyarylates, alkyd-based polymers (e.g., polymers based on glyceride oil), copolymers (e.g., polyethylene-co-vinyl acetate and polyethylene-co-acrylic acid), and mixtures thereof. The term polymer is meant to be construed to include any substances that become available after the filing of this application and that exhibit the general polymeric properties described above.

As used herein, the term "chemical bond" and its grammatical variations refer to a coupling of two or more atoms based on an attractive interaction, such that those atoms can form a stable structure. Examples of chemical bonds include covalent bonds and ionic bonds. Other examples of chemical bonds include hydrogen bonds and attractive interactions between carboxy groups and amine groups.

As used herein, the term "molecular group" and obvious variations thereof, refers to a set of atoms that form a portion of a molecule. In some instances, a group can include two or more atoms that are chemically bonded to one another to form a portion of a molecule. A group can be neutral on the one hand or charged on the other, e.g., monovalent or polyvalent (e.g., bivalent) to allow chemical bonding to a set of additional groups of a molecule. For example, a monovalent group can be envisioned as a molecule with a set of hydride groups removed to allow chemical bonding to another group of a molecule. A group can be neutral, positively charged, or negatively charged. For example, a positively charged group can be envisioned as a neutral group with one or more protons (i.e., H+) added, and a negatively charged group can be envisioned as a neutral group with one or more protons removed. A group that exhibits a characteristic reactivity or other set of properties can be referred to as a functional group, reactive function or reactive functional groups. Examples of reactive functional groups include such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

As used herein, the term "covalent bond" means a form of chemical bonding that is characterized by the sharing of pairs of electrons between atoms, or between atoms and other covalent bonds. Attraction-to-repulsion stability that forms between atoms when they share electrons is known as covalent bonding. Covalent bonding includes many kinds of interactions, including σ-bonding, π-bonding, metal-metal bonding, agostic interactions, and three-center two-electron bonds.

Figure 4:
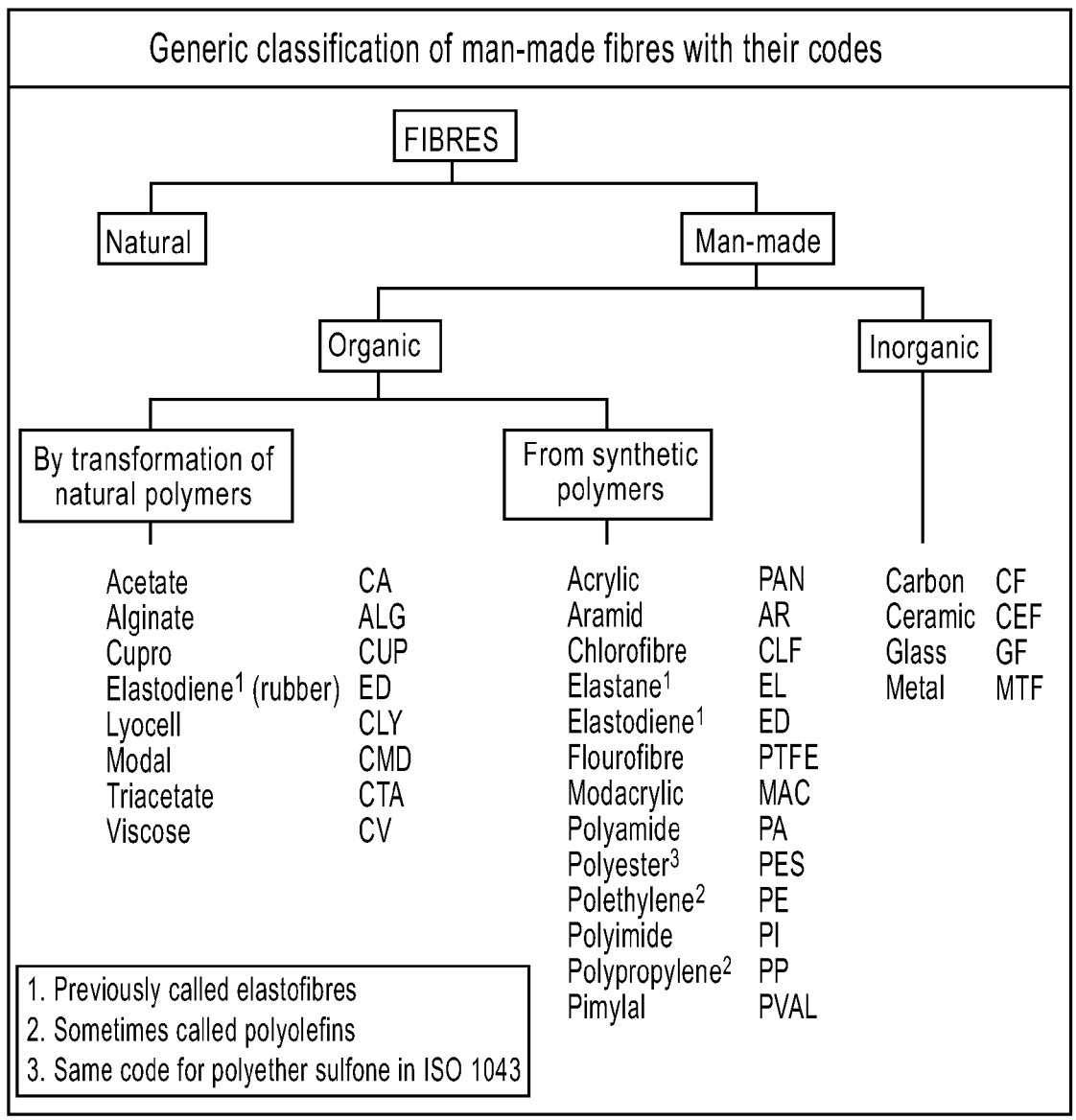
FIG. 4 is a chart depicting the generic classifications of man-made fibers which can incorporate FP-PCM or be made into wovens, knits, nonwoven or other substrates which can be treated with FP-PCM.

The reactive function could be of various chemical natures. For example, reactive functions capable of reacting and forming electrovalent bonds or covalent bonds with reactive functions of various substrates, e.g. cotton, wool, fur, leather, polyester and textiles made from such materials, as well as other base materials. For example, materials made from natural, regenerated or synthetic polymers/fibers/materials may form a electrovalent bond. Further examples of such substrates include various types of natural products including animal products such as alpaca, angora, camel hair, cashmere, catgut, chiengora, llama, mohair, silk, sinew, spider silk, wool, and protein based materials, various types of vegetable based products such as bamboo, coir, cotton, flax, hemp, jute, kenaf, manila, piña, raffia, ramie, sisal, and cellulose based materials; various types of mineral based products such as asbestos, basalt, mica, or other natural inorganic fibers. Generally, man-made fibers are classified into three classes, those made from natural polymers, those made from synthetic polymers and those made from inorganic materials. FIG. 4 depicts the generic classification of man made fibers with their International Bureau for the Standardization of Man-Made Fibres (BISFA) codes. A general description follows.

Melt Flow Index—As used herein the term Melt flow index or MFI is a measure of the ease of flow of the melt of a polymer. In academic terms the melt flow is defined as the mass of polymer, in grams, flowing in ten minutes through a capillary of a specific diameter and length by a pressure applied via prescribed alternative gravimetric weights for alternative prescribed temperatures. The method is described in the similar standards ASTM D1238 and ISO 1133.

Melt flow rate is an indirect measure of molecular weight, with high melt flow rate corresponding to low molecular weight. At the same time, melt flow rate is a measure of the ability of the material's melt to flow under pressure. Melt flow rate is inversely proportional to viscosity of the melt at the conditions of the test, though it should be borne in mind that the viscosity for any such material depends on the applied force. Ratios between two melt flow rate values for one material at different gravimetric weights are often used as a measure for the broadness of the molecular weight distribution.

Molecular Weight Polydispersity—A polydispersity index (PDI), is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity (1). For some natural polymers PDI is almost taken as unity. The PDI from polymerization is often denoted as:

$$PDI = M_w/M_n$$

Mn is more sensitive to molecules of low molecular mass, while Mw is more sensitive to molecules of high molecular mass. A polymer material is denoted by the term polydisperse if its chain lengths vary over a wide range of molecular masses.

Stereochemistry—Stereochemistry involves the study of the relative spatial arrangement of atoms within molecules. One branch of stereochemistry is the study of chiral molecules. Stereochemistry is also known as 3D chemistry.

Polymerization—Polymerization is a process of reacting monomer molecules together in a chemical reaction to form three-dimensional networks or polymer chains. Many forms of polymerization and different systems exist to categorize them are know in the art.

Fibers from Natural Polymers—The most common natural polymer fibre is viscose, which is made from the polymer cellulose obtained mostly from farmed trees. Other cellulose-based fibers are cupro, acetate and triacetate, lyocell and modal. The production processes for these fibers are given within this disclosure. Less common natural polymer fibers are made from rubber, alginic acid and regenerated protein.

Fibers from Synthetic Polymers—There are very many synthetic fibers, i.e. organic fibers based on petrochemicals. The most common are polyester, polyamide (often called nylon), acrylic and modacrylic, polypropylene, the segmented polyurethanes which are elastic fibers known as elastanes (or spandex in the USA), and specialty fibers such as the high performance aramids.

Fibers from Inorganic Materials—The inorganic man-made fibers are fibers made from materials such as glass, metal, carbon or ceramic. These fibers are very often used to reinforce plastics to form composites.

Examples of suitable reactive functional groups include functional groups such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

Further details of the variety of examples of reactive functions and functional groups that may be used in accordance with one or more aspects of the present invention can be found in commonly owned and co-pending patent application Ser. Nos. 12/174,607 and 12/174,609, the details of which have been incorporated by reference into this disclosure. It should be clearly understood that by providing examples of specific compositions and methods in the later part of this description, applicant does not intend to limit the scope of the claims to any of those specific composition. To the contrary, it is anticipated that any combination of the functional groups, polymeric phase change materials, and articles described herein may be utilized to achieve the novel aspects of the present invention. The claims are not intended to be limited to any of the specific compounds described in this disclosure or any disclosure incorporated herein.

Several publications referenced herein deal with polymeric PCMs (P-PCM), which in a way, present an intermediate case between the solid-liquid PCMs and the solid-solid PCMs. P-PCMs are solid both prior to phase change and after it. The difference is in their degree of structure. At lower temperatures, that degree is greater than that at the elevated temperature, so that at a temperature of phase change, P-PCM converts from the more structured form into its less structured one. Typically, in the more structures form, some sections of the polymer are better aligned and more closely compacted. The better aligned sections resemble crystallites. Therefore, the phase change on heating P-PCM is also referred to as change from a more crystallized form to a less crystallized form. Differently put, at the elevated temperatures (above the transition temperature), P-PCMs are essentially amorphous. At the lower temperatures (below the transition temperature) they have a degree of crystallinity. Similarly, the changes on heat absorption and on heat release could be referred to as decrystallization and recrystallization, respectively. The related enthalpy could also be referred to as enthalpy of decrystallization.

Typically, P-PCMs have sections that are capable of being better aligned and more closely compacted. Such sections could be referred to as crystallizable sections. In some embodiments, the functional polymeric PCM described herein in accordance with various aspects of the present invention comprises at least one such crystallizable section. According to an embodiment of the invention, the polymer comprises a backbone and side chains. Preferably, the side chains form a crystallizable section.

As used here, the term "reactive function" means a chemical group (or a moiety) capable of reacting with another chemical group to form a covalent or an electrovalent bond, examples of which are given above. Preferably, such reaction is doable at relatively low temperatures, e.g. below 200° C., more preferably below 100° C., and at conditions suitable to handle delicate substrates, e.g. textile. As used herein the term "carrying a function" and obvious variations of this term, means having a function bound to it, e.g. covalently or electrovalently.

The reactive function could be placed on (carried on or covalently bound or electrovalently bonded to) any part of the FP-PCM molecule, e.g. on a side chain, along the backbone chain or on at least one of the ends of the backbone chain or side chain. According to various embodiments of the invention, the FP-PCM comprises multiple reactive functions and those functions are spread at substantially regular intervals, stereospecifically or randomly along the molecule, e.g. along the backbone chain. Any combination of these is also possible.

The molecular weight of FP-PCM of the present invention is preferably of at least 500 Daltons, more preferably at least 2000 Daltons. Preferably the weight of the crystallizable section forms at least 20%, more preferably at least 50%, and most preferably at least 70% of the total weight of the FP-PCM.

Aspects of the present invention has a single phase change temperature or multiple such temperatures. According to one embodiment, the FP-PCM has at least one phase change temperature in the range between −10° C. and 100° C., preferably between 10° C. and 60° C. and a phase change enthalpy of at least 25 J/g. In some instances, a phase change material can have a latent heat that is at least about 1 Joule per gram, at least about 5 Joules per gram (J/g), at least about 10 J/g, at least about 20 J/g, at least about 30 J/g, at least about 40 J/g, at least about 50 J/g, at least about 60 J/g, at least about 70 J/g, at least about 80 J/g, at least about 90 J/g, or at least about 100 J/g. Thus, for example, the phase change material can have a latent heat from about 5 J/g to about 400 J/g, 10 J/g to about 100, J/g, 20 J/g to about 100 J/g, from about 60 J/g to about 400 J/g, from about 80 J/g to about 400 J/g, or from about 100 J/g to about 400 J/g.

The phase change at each of the temperatures has its own enthalpy, so that according to some of the embodiments, the article has a single phase change enthalpy and, according to other embodiments, multiple such enthalpies. As used herein, the term "overall phase change enthalpy" refers to the enthalpy of phase change in the case of article with a single phase change temperature and to the combined enthalpies in case of multiple phase change temperatures. According to an embodiment of the invention, the article has an overall phase change enthalpy of at least 2.0 Joules/gram (J/g) or 10 J/m².

While each of the FP-PCM molecules carries at least one reactive function, large FP-PCM molecules may carry multiple reactive functions. According to an embodiment of the invention, an FP-PCM carries at least one reactive function per 10,000 Daltons of the molecular weight and preferably two reactive functions.

As indicated, the reactive function of the FP-PCM of the present invention should be capable of forming covalent or electrovalent bonds with various articles, compounds and other molecules, commonly referred to here as base materials or substrates. According to another embodiment, substrates are selected from a group consisting of cotton, wool, fur, leather, polyester and textiles made from such materials. Examples of reactive functions capable of forming covalent bonds are acid anhydride groups, amino groups, N-substituted amino groups, carbonyl groups, carboxy groups, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or and combinations thereof. FP-PCMs capable of forming covalent bonds are disclosed in commonly assigned U.S. patent application Ser. No. 12/174,607, the teaching of which is incorporated herein by reference in its entirety. Examples of reactive functions capable of forming electrovalent bonds are acid functions, basic functions, positively charged complexes and negatively charged complexes. FP-PCM capable of forming electrovalent bonds such as disclosed in commonly assigned U.S. patent application Ser. No. 12/174,609, the teaching of which is incorporated herein by reference in its entirety.

According to another embodiment of the invention, the article forming the substrate further comprises at least one other ingredient. Suitable ingredients may be selected from a group consisting of another FP-PCM, another PCM, microcapsules comprising PCM, microcapsules with other additives, binders, crosslinkers, blending polymers, compatibilizers, wetting agents, and additives. The FP-PCM may also be bound to the at least one other ingredient.

According to another embodiment, the functional polymeric phase change material is chemically bound to the substrate. Binding may be one of covalent binding, electrovalent binding, direct binding, or binding via a connecting compound. According to another embodiment, binding is such as the one resulting from a reaction between a reactive function of the FP-PCM and a reactive function of the substrate, preferably the binding is a result of such reaction. The substrate can be selected from the group consisting of textiles such as natural fibers, fur, synthetic fibers, regenerated fibers, woven fabric, knit fabric, nonwoven fabric, foams, paper, leather, plastic or polymeric layers such as plastic films, plastic sheets, laminates or combinations of above.

Textiles described herein can be used for any garment or article that comes in contact with a human or animal body. This includes hats, helmets, glasses, goggles, masks, scarves, shirts, baselayers, vests, jackets, underwear, lingerie, bras, gloves, liners, mittens, pants, overalls, bibs, socks, hosiery, shoes, boots, insoles, sandals, bedding, sleeping bags, blankets, mattresses, sheets, pillows, textile insulation, backpacks, sports pads/padding, etc. The textile article can contain the FP-PCM or can be coated, laminated or molded. For instance, fibers can be manufactured with the FP-PCM contained in the fiber, coated onto the fiber or treated in which the fiber and FP-PCM interact. This is applicable also to any step in a textile manufacturing process.

Articles described herein can be used in conjunction with one or more of the following categories of products and articles:

Shipping, storage or packaging containers/equipment such as paper, glass, metal, plastic, ceramic, organic or inorganic materials in the form of envelopes, sleeves, labels, cardboard, wrapping, wires, tiedowns, insulation, cushioning, pads, foams, tarps, bags, boxes, tubes, containers, sheet, film, pouches, suitcases, cases, packs, bottles, jars, lids, covers, cans, jugs, glasses, tins, pails, buckets, baskets, drawers, drums, barrels, tubs, bins, hoppers, totes, truck/ship containers or trailers, carts, shelves, racks, etc. These articles can especially be used in the food packaging, shipment, food delivery, medical shipment, medical delivery, body shipment, etc. industries.

Medical, health, therapeutic, curative, and wound management articles such as bandages, wraps, wipes, stents, capsules, drug, delivery devices, tubes, bags, pouches, sleeves, foams, pads, sutures, wires, etc.

Building, construction, and interior articles where energy management and off-peak energy demand reduction is desired. These articles can include such as upholstery, furniture, beds, furnishings, windows, window coatings, window treatments and coverings, wallboard, insulation, fiberglass insulation fibers, fiberglass insulation batting, fiberglass insulation fill, cellulosic fill insulation, polystyrene foam insulation, polyisocyanate foam insulation, polyisocyanurate foam insulation, insulation boards, gypsum boards and wall boards, (maybe include our pPCM insulation and building construction application . . . ) foams, piping, tubes, wiring, laminates, bricks, stones, siding, panels for wall or ceiling, flooring, cabinets, building envelopes, building wrap, wallpaper, paint, shingles, roofing, frames, etc. The use of alternative construction techniques and such articles are also included as straw bale construction, mud or adobe construction, brick or stone construction, metal container construction, etc.

Electronics and electrical articles such as conductors, heat sinks, semiconductors, transistors, integrated circuits, wiring, switches, capacitors, resistors, diodes, boards, coverings, motors, engines, etc.

Articles for use in industries such as automotive, heavy equipment, trucking, food/beverage delivery, cosmetics, civil service, agriculture, hunting/fishing, manufacturing, etc. which incorporate articles described above.

Cosmetics such as creams, lotions, shampoos, conditioners, bodywash, soaps, hair gels, mousse, lipstick, deodorant, moisturizers, nail polish, glosses, lipsticks, makeup, eyeliners/eyeshadow, foundations, blushes, mascara, etc.

Controlled release articles in which the FP-PCM creates a barrier when in one phase and allows movement when in another phase. The barrier can be due to trapping of the material within the FP-PCM crystalline domain matrix or physical layers between the materials, etc. This phase shift to change the barrier characteristics can be triggered by energy such as light, UV, IR, heat, thermal, plasma, sound, microwave, radiowave, pressure, x-ray, gamma, or any form of radiation or energy. The barrier can prevent movement of or release of such as materials, colors or energy. A further example is a barrier to liquid materials or the blocking/unblocking of light or color, the change of stiffness or flexibility at various temperatures, etc. Further examples are the containment/release of catalysts, chemical reaction control agents (increase or decrease reaction), adhesion, enzymes, dyes, colors, stabilizers for or against light and/or temperature, nano or microparticles, temperature or fraud markers, etc.

In addition, the FP-PCM can be incorporated into articles as outlined in the following commonly assigned patents: For coating, such as in U.S. Pat. No. 5,366,801, Fabric with Reversible Enhanced Thermal Properties; U.S. Pat. No. 6,207,738, Fabric Coating Composition Containing Energy Absorbing Phase Change Material; U.S. Pat. No. 6,503,976, Fabric Coating Composition Containing Energy Absorbing Phase Change Material and Method of Manufacturing Same; U.S. Pat. No. 6,660,667, Fabric Coating Containing Energy Absorbing Phase Change Material and Method of Manufacturing Same; U.S. Pat. No. 7,135,424, Coated Articles Having Enhanced Reversible Thermal Properties and Exhibiting Improved Flexibility, Softness, Air Permeability, or Water Vapor Transport Properties; U.S. application Ser. No. 11/342,279, Coated Articles Formed of Microcapsules with Reactive Functional Groups.

For Fibers such as in U.S. Pat. No. 4,756,958, Fiber with Reversible Enhanced Thermal Storage Properties and Fabrics Made Therefrom; U.S. Pat. No. 6,855,422, Multi-Component Fibers Having Reversible Thermal Properties; U.S. Pat. No. 7,241,497, Multi-Component Fibers Having Reversible Thermal Properties; U.S. Pat. No. 7,160,612, Multi-Component Fibers Having Reversible Thermal Properties; U.S. Pat. No. 7,666,500, Multi-Component Fibers Having Reversible Thermal Properties; U.S. Pat. No. 7,244,497, Cellulosic Fibers Having Enhanced Reversible Thermal Properties and Methods of Forming Thereof; U.S. Pat. No. 7,790,283, Cellulosic Fibers Having Enhanced Reversible Thermal Properties and Methods of Forming Thereof.

For Fibers, laminates, extruded sheet/film or molded goods, such as in U.S. Pat. No. 6,793,85, Melt Spinable Concentrate Pellets Having Enhanced Reversible Thermal Properties; U.S. application Ser. No. 11/078,656, Polymeric composites having enhanced reversible thermal properties and methods of forming thereof; PCT App. No. PCT/US07/71373, Stable Suspensions Containing Microcapsules and Methods for Preparation Thereof.

These embodiments and articles can be used in any application where temperature regulation, temperature buffering, temperature control or latent heat of fusion is utilized, or any phase transition phenomenon is employed. These applications may or may not be used in conjunction with hydrophilic properties, hydrophobic properties, moisture absorbing, moisture releasing, organic materials absorption or release, inorganic materials absorption or release, cross-linking, anti-microbial, anti-fungal, anti-bacterial, biodegradability, decomposition, anti-odor, odor controlling, odor releasing, grease and stain resistance, stabilization for oxidation or ageing, fire retardant, anti-wrinkle, enhanced rigidity or flexibility, UV or IR screening, impact resistance or control, color addition, color change, color control, catalytic or reaction control, sound, light, optical, static or energy management, surface tension, surface smoothness, or surface properties control, anti-fraud or brand marking control, controlled release/containment, or controlled barrier properties, etc.

In accordance with another aspect a method is provided for the production of an article described herein, comprising providing a FP-PCM, providing a substrate and combining the FP-PCM with the substrate. According to one embodiment, the substrate carries at least one reactive function and the combining comprises chemically reacting a functional group of the FP-PCM with a functional group of the substrate.

According to another aspect, a precursor for the production of the article is provided, which precursor comprises a functional polymeric phase change material and at least one other ingredient.

According to another aspect, a method for the production of the article comprises providing a precursor, providing a substrate, and combining the FP-PCM of the precursor with the substrate. The substrate may carry at least one reactive function. Combining the FP-PCM of the precursor with the substrate comprises chemically reacting a functional group of the FP-PCM with a functional group of the substrate.

The selection of a material forming the substrate may be dependent upon various considerations, such as its affinity to the FP-PCM, its ability to reduce or eliminate heat transfer, its breathability, its drapability, its flexibility, its softness, its water absorbency, its film-forming ability, its resistance to degradation under ambient or processing conditions, and its mechanical strength. In particular, for certain implementations, a material forming the substrate can be selected so as to include a set of functional groups, such as acid anhydride groups, aldehyde groups, amino groups, N-substituted amino groups, carbonyl groups, carboxy groups, epoxy groups, ester groups, ether groups, glycidyl groups, hydroxy groups, isocyanate groups, thiol groups, disulfide groups, silyl groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), or combinations thereof. At least some of these functional groups can be exposed on a top surface of the substrate and can allow chemical bonding to a set of complementary functional groups included in the embodiments and additives, thereby enhancing durability of the article during processing or during use. Thus, for example, the substrate can be formed of cellulose and can include a set of hydroxy groups, which can chemically bond to a set of carboxy groups included in the FP-PCM. As another example, the substrate can be a proteinacous material and can be formed of silk or wool and can include a set of amino groups, which can chemically bond to those carboxy groups included in the FP-PCM. As can be appreciated, chemical bonding between a pair of functional groups can result in the formation of another functional group, such as an amide group, an ester group, an ether group, an urea group, or an urethane group. Thus, for example, chemical bonding between a hydroxy group and a carboxy group can result in the formation of an ester group, while chemical bonding between an amino group and a carboxy group can result in the formation of an amide group.

For certain implementations, a material forming the substrate can initially lack a set of functional groups, but can be subsequently modified so as to include those functional groups. In particular, the substrate can be formed by combining different materials, one of which lacks a set of functional groups, and another one of which includes those functional groups. These different materials can be uniformly mixed or can be incorporated in separate regions or separate sub-layers. For example, the substrate can be formed by combining polyester fibers with a certain amount (e.g., 25 percent by weight or more) of cotton or wool fibers that include a set of functional groups. The polyester fibers can be incorporated in an outer sub-layer, while the cotton or wool fibers can be incorporated in an inner sub-layer, adjacent to other layers. As another example, a material forming the substrate can be chemically modified so as to include a set of functional groups. Chemical modification can be performed using any suitable technique, such as using oxidizers, corona treatment, or plasma treatment. Chemical modification can also be performed as described in the patent of Kanazawa, U.S. Pat. No. 6,830,782, entitled "Hydrophilic Polymer Treatment of an Activated Polymeric Material and Use Thereof," the disclosure of which is incorporated herein by reference in its entirety. In some instances, a material forming the substrate can be treated so as to form radicals that can react with monomers including a set of functional groups. Examples of such monomers include those with anhydride groups (e.g., maleic anhydride), those with carboxy groups (e.g., acrylic acid), those with hydroxy groups (e.g., hydroxylethyl acrylate), and those with epoxy or glycidyl groups (e.g., glycidyl methacrylate). In other instances, a material forming the substrate can be treated with a set of functional materials to add a set of functional groups as well as to provide desirable moisture management properties. These functional materials can include hydrophilic polymers, such as polyvinyl alcohol, polyglycols, polyacrylic acid, polymethacrylic acid, hydrophilic polyesters, and copolymers thereof. The acid functionality can be partially or fully neutralized to form a salt. These salts can consist of Li, Be, Na, Mg, K, Ca, Rb, Sr, Ti, V, Mn, Fe, Co Ni, Cu Zn Ga, Ge As, Se, Al, B, N, Y, Zr, Nb, Mo, Ru, Rh, Pd, Ag, Cd, In, Sn, Sb, Te, Cs, Ba, La, Hf, Ta, W, Re, Os, Ir, Pt, Au, Hg, Tl, Pb, Bi, Po, A Ra, Ac, Ce, Nd, Pm, Sm, Eu, Gd, Tb, Dy, Ho, Er, Tm, Yb, Lu, Th, Pa, U, Pu, etc. These elements may exist in many different ionic states, i.e. $Fe^{+2}$ or $Fe^{+4}$. The salt may consist of a single or mix of ions. For example, these functional materials can be added during a fiber manufacturing process, during a fabric dyeing process, or during a fabric finishing process. Alternatively, or in conjunction, these functional materials can be incorporated into a fabric via exhaust dyeing, pad dyeing, or jet dyeing.

The FP-PCM can be implemented as a coating, laminate, infusion, treatment or ingredient in a coating, laminate, infusion, treatment that is formed adjacent to, on or within the substrate using any suitable coating, laminating, infusion, etc. technique. During use, the FP-PCM can be positioned so that it is adjacent to an internal compartment or an individual's skin, thus serving as an inner coating. It is also contemplated that the FP-PCM can be positioned so that it is exposed to an outside environment, thus serving as an outer coating. The FP-PCM covers at least a portion of the substrate. Depending on characteristics of the substrate or a specific coating technique that is used, the FP-PCM can penetrate below the top surface and permeate at least a portion of the substrate. While two layers are described, it is contemplated that the article can include more or less layers for other implementations. In particular, it is contemplated that a third layer can be included so as to cover at least a portion of a bottom surface of the substrate. Such a third layer can be implemented in a similar fashion as the FP-PCM or can be implemented in another fashion to provide different functionality, such as water repellency, stain resistance, stiffness, impact resistance, etc.

In one embodiment, the FP-PCM is blended with a binder which may also contain a set of microcapsules that are dispersed in the binder. The binder can be any suitable material that serves as a matrix within which the FP-PCM and possibly also the microcapsules are dispersed, thus offering a degree of protection to the FP-PCM and microcapsules against ambient or processing conditions or against abrasion or wear during use. For example, the binder can be a polymer or any other suitable medium used in certain coating, laminating, or adhesion techniques. For certain implementations, the binder is desirably a polymer having a glass transition temperature ranging from about $-110°$ C. to about $100°$ C., more preferably from about $-110°$ C. to about $40°$ C. While a polymer that is water soluble or water dispersible can be particularly desirable, a polymer that is water insoluble or slightly water soluble can also be used as the binder for certain implementations.

The selection of the binder can be dependent upon various considerations, such as its affinity for the FP-PCM and/or microcapsules or the substrate, its ability to reduce or eliminate heat transfer, its breathability, its drapability, its flexibility, its softness, its water absorbency, its coating-forming ability, its resistance to degradation under ambient or processing conditions, and its mechanical strength. In particular, for certain implementations, the binder can be selected so as to include a set of functional groups, such as acid anhydride groups, amino groups and their salts, N-substituted amino groups, amide groups, carbonyl groups, carboxyl groups and their salts, cyclohexyl epoxy groups, epoxy groups, glycidyl groups, hydroxyl groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

These functional groups can allow chemical bonding to a complementary set of functional groups included in either of, or any of, the FP-PCM, the microcapsules and the substrate, thereby enhancing durability of the article during processing or during use. Thus, for example, the binder can be a polymer that includes a set of epoxy groups, which can chemically bond to a set of carboxy groups included in the FP-PCM and/or the microcapsules. As another example, the binder can be a polymer that includes a set of isocyanate groups or a set of amino groups, which can chemically bond with those carboxy groups included in the FP-PCM, microcapsules, or substrate.

In some instances, a set of catalysts can be added when forming the coating composition. Such catalysts can facilitate chemical bonding between complementary functional groups, such as between those included in the binder and those included in the microcapsules. Examples of materials that can be used as catalysts include boron salts, hypophosphite salts (e.g., ammonium hypophosphite and sodium hypophosphite), phosphate salts, tin salts (e.g., salts of $Sn^{+2}$ or $Sn^{+4}$, such as dibutyl tin dilaurate and dibutyl tin diacetate), and zinc salts (e.g., salts of $Zn^{+2}$). A desirable amount of a tin salt or a zinc salt that is added to the coating composition can range from about 0.001 to about 1.0 percent by dry weight, such as from about 0.01 to about 0.1 percent by dry weight. A desirable amount of a boron salt or a phosphate salt that is added to the coating composition can range from about 0.1 to about 5 percent by dry weight, such as from about 1 to about 3 percent by dry weight. Other examples of materials that can be used as catalysts include alkylated metals, metal salts, metal halides, and metal oxides, where suitable metals include Li, Be, Na, Mg, K, Ca, Rb, Sr, Ti, V, Mn, Fe, Co Ni, Cu Zn Ga, Ge As, Se, Al, Y, Zr, Nb, Mo, Ru, Rh, Pd, Ag, Cd, In, Sn, Sb, Te, Cs, Ba, La, Hf, Ta, W, Re, Os, Ir, Pt, Au, Hg, Tl, Pb, Bi, Po, A Ra, Ac, Ce, Nd, Pm, Sm, Eu, Gd, Tb, Dy, Ho, Er, Tm, Yb, Lu, Th, Pa, U, Pu, etc. These metals and their compounds can be used singly or blended. Organic acids and bases, such as those based on sulfur (e.g., sulfuric), nitrogen (e.g., nitric), phosphorous (e.g., phosphoric), or halides (e.g., F, Cl, Br, and I), can also be used as catalyst. Further examples of materials that can be used as catalysts include acids such as citric acid, itaconic acid, lactic acid, fumaric acid, and formic acid.

Bonds between substrate, functional phase change material, binder and/or microcapsules are, according to various embodiments, covalent, electrovalent or various combinations of those. Binding could be direct or indirect, e.g. via a connecting compound. According to some embodiments, the connecting compound is selected from a group consisting of functional polymeric phase change material and microcapsules. According to another embodiment, the functional polymeric phase change material forms a binder for at least a portion of a second PCM.

According to another embodiment, the reactive function of the FP-PCM can be converted into another reactive function, which is more suitable for reacting with particular substrates.

According to another embodiment, the reactive function of the FP-PCM could be of various chemical nature. For example, reactive functions capable of reacting and forming covalent or electrovalent bonds with reactive functions of various substrates, e.g. cotton, wool, fur leather, polyester and textiles made from such materials.

According to another embodiment of the invention, the reactive function can be any of the following: 1) glycidyl or epoxy such as from glycidyl methacrylate or glycidyl vinyl ether; 2) anhydride such as from maleic anhydride or itaconic anhydride; 3) isocyanate such as from isocyanato methacrylate, TMI® from Cytec Ind. or blocked isocyanates such as 2-(0-[1'-methylproplyideneamino]carboxyamino) ethyl methacrylate; 4) amino or amine-formaldehyde such as from N-methylolacrylamide; and 5) silane such as from methacryloxypropyltriethoxysilane. Such reactive functions can react with OH functional groups of cellulosic based textiles such as cotton; with amine functional groups of proteinaceous based textiles such as wool, fur or leather; with hydroxyl or carboxyl groups of polyester based textiles and with amide functional groups of nylon functional resins.

According to still another embodiment of the invention, the reactive function is a double bond, capable of binding to another double bond, providing a cross-linking point, a polymerization point, etc. The above described reactions, linking or crosslinking reactions can be triggered by any energy such as light, UV, IR, heat, thermal, plasma, sound, microwave, radiowave, pressure, x-ray, gamma, or any form of radiation or energy. They can be triggered by chemical reactions such as by the use of free radical, anionic or cationic catalysts or initiators.

The reactive function of the FP-PCM can assume a positive charge and bind electrovalently with a negative charge on the substrate. According to another embodiment, the reactive function can assume a negative charge and bind electrovalently with a positive charge on the substrate. According to another embodiment, the reactive functions of both the substrate and the FP-PCM and/or microcapsule are negatively charged and binding is via a multivalent cation, which acts as a cross-linker. According to still another embodiment, the reactive functions of both the substrate and the FP-PCM and/or microcapsule are positively charged and binding is via a multivalent anion, which acts as a cross-linker. The cross-linking multivalent cation, anion or both could be organic or inorganic.

An article constructed in accordance with various aspects of the present invention can have a single phase change temperature or multiple phase change temperatures, e.g. in cases wherein the FP-PCM has multiple types of crystallizable sections or cases wherein the article comprises multiple FP-PCMs of different types. An article constructed in accordance with aspects of the present invention has at least one phase change temperature in the range between −10° C. and 100° C., preferably between 10° C. and 60° C. and phase change enthalpy of at least 2.0 Joules/gram (J/g) or 10 J/m². According to other embodiments, the functional polymeric phase change material comprises hydrophilic crystallizable section, hydrophobic crystallizable section or both. As example, an AB block copolymer, made of segments such as polystearyl methacrylate and polyethylene glycol methacrylate would have two different phase change temperatures and hydrophilic/hydrophobic properties. One phase change temperature from the stearyl hydrophobic crystallizable side chains and another phase change temperature from the glycol hydrophilic crystallizable side chains.

The phase change at each of the temperatures has its own enthalpy, so that the article has according to some of the embodiments a single phase change enthalpy and, according to others, multiple such enthalpies. According to an embodiment of the invention, the article has an overall phase change enthalpy of at least 2.0 Joules/gram (J/g) or 10 J/m².

According to another aspect, the present invention provides a precursor for the production of an article according to the second aspect, which precursor comprises the functional polymeric phase change material and at least one other ingredient. The one other ingredient is selected from a group consisting of an organic solvent, an aqueous solvent, another FP-PCM, another PCM, microcapsules comprising PCM, microcapsules with other additives, binders, cross-linkers, blending polymers, compatibilizers, wetting agents, catalysts and additives, and their combinations. Examples of precursors are formulations used for the coating, dyeing, dipping, spraying, brushing, padding, printing, etc. of substrates, the predispersion of FP-PCMs for addition to manufacturing lines such as injecting into fiber dope on spin lines, Colorant and tint formulations, additive masterbatches or dispersions, neutralizing or pH adjusting solutions, the formulation of plastic pellets or masterbatches for extrusion and formation of melt spun fibers, molded parts, film, sheets or laminated products. These are described in cited and included Outlast patents and applications above.

According to another embodiment, a method is provided for the production of an article, comprising providing a precursor, providing a substrate and combining the FP-PCM of the precursor with the substrate. The substrate preferably carries at least one reactive function and combining the FP-PCM of the precursor with the substrate comprises chemically reacting a functional group of the FP-PCM with a functional group of the substrate.

Further examples of binders or crosslinkers are polymers, oligomers or molecules with multiple reactive functional groups which can interact or bond with another of the same, another FP-PCM, another PCM, microcapsules comprising PCM, microcapsules with other additives, binders, crosslinkers, blending polymers, compatibilizers, wetting agents, additives, etc. The bonds or interactions can be either covalent or ionic.

For certain implementations, a set of reactive components or modifiers can also be added when forming the composition. Such modifiers can allow cross-linking of the FP-PCM and/or binder to provide improved properties, such as durability and other properties. Examples of materials that can be used as modifiers include polymers, such as melamine-formaldehyde resins, urea-formaldehye resins, polyanhydrides, urethanes, epoxies, acids, polyurea, polyamines or any compound with multiple reactive functional groups. A desirable amount of a modifier that is added to the coating composition can range from about 1 to about 20 percent by dry weight, such as from about 1 to about 5 percent by dry weight. Also, a set of additives can be added when forming the composition. In some instances, these additives can be contained within the microcapsules. For examples of additives include those that improve water absorbency, water wicking ability, water repellency, stain resistance, dirt resistance, and odor resistance. Additional examples of additives include anti-microbials, flame retardants, surfactants, dispersants, and thickeners.

In accordance with other examples and embodiments, various types of thickeners and rheology control agents may be used in conjunction with the compositions disclosed herein. For example these may include silicas (more fully disclosed in paragraph 106), cellulose based thickeners such as hydroxyethyl cellulose, and carboxymethylcellulose. Other examples include polyacrylic acids and copolymers such as superabsorbents or various molecular weight polymers or copolymers that are based on acid functionality. The acid group can be fully or partially hydrolyzed, polyamines, hydrophobically modified, ethoxylated urethane (HEUR), high molecular weight or low MF polymers, and their blends such as polyolefins and copolymers, polyglycols like polyethylene oxide. Further examples include acrylic polymers, cross-linked acrylic polymers, alginates, associative thickeners, carrageenan, microcrystalline cellulose, carboxymethylcellulose sodium, hydroxyethylcellulose, hydroxypropylcellulose, hydroxypropylmethylcellulose, methylcellulose, guar & guar derivatives, locust bean gum, organoclay, polyethylene, polyethylene oxide, polyvinyl pyrrolidone, silica, water-swellable clay, and xanthan gum.

In certain embodiments, containment structures and other containment additives may be utilized. Containment structures may be microcapsules or a particulate. For instance, PCMs can be absorbed and stable into any number of particles including silica (amorphous, crystalline, fumed, precipitated, hydrophobic, hydrophilic, hydrated, treated, etc.), graphite, carbon or activated carbon, zeolites, organoclays, vermiculite, metal oxides, metal carbides (i.e. $TiO_2$, ZnO, Talc, ZrC, etc). These particles can be of any size or shape from nanoparticles to millimeter sized particles such as carbon or silica nanotubes or nanoparticles, i.e. 1 nanometer in diameter to 100 millimeters in diameter. The particles can be any shape or porosity. Paraffin or hydrophobic PCMs can also be absorbed in any number of polymers, especially crosslinked polymers, similar to how a plasticizer will absorb into plastics. For instance PCM can be absorbed into any polyolefin and polyolefin copolymer such as polyethylene, polypropylene, polyvinyls, aliphatic polyesters, rubbers, copolymers and mixtures, etc. PCMs based on glycols can be absorbed into hydrophilic polymers.

Other materials which can absorb or contain PCMs such as standard superabsorbant polymers based on cross-linked sodium polyacrylate. Other materials are also used to make a superabsorbent polymer, such as polyacrylamide copolymer, ethylene maleic anhydride copolymer, cross-linked carboxy-methyl-cellulose, polyvinyl alcohol copolymers, cross-linked polyethylene oxide, and starch grafted copolymer of polyacrylonitrile to name a few. Further examples of additives and other modifiers are set forth below.

Moisture management, hydrophilic and polar materials— such as including or based on acids, glycols, salts, hydroxy group-containing materials (e.g., natural hydroxy group-containing materials), ethers, esters, amines, amides, imines, urethanes, sulfones, sulfides, natural saccharides, cellulose, sugars and proteins Grease, dirt and stain resistance—such as non-functional, non-polar, and hydrophobic materials, such as fluorinated compounds, silicon-containing compounds, hydrocarbons, polyolefins, and fatty acids.

Anti-microbial, Anti-fungal and Anti-bacterial—such as complexing metallic compounds based on metals (e.g., silver, zinc, and copper), which cause inhibition of active enzyme centers, copper and copper-containing materials (e.g., salts of $Cu.+2$ and $Cu.+$), such as those supplied by Cupron Ind., silver and silver-containing materials and monomers (e.g., salts of Ag, Ag.+, and Ag+2), such as supplied as ULTRA-FRESH by Thomson Research Assoc. Inc. and as SANITIZED Silver and Zinc by Clariant Corp. oxidizing agents, such as including or based on aldehydes, halogens, and peroxy compounds that attack cell membranes (e.g., supplied as HALOSHIELD by Vanson HaloSource Inc.) 2,4,4'-trichloro-2'-hydroxy dipenyl ether (e.g., supplied as TRICLOSAN), which inhibits growth of microorganisms by using an electro-chemical mode of action to penetrate and disrupt their cell walls, quaternary ammonium compounds, biguanides, amines, and glucoprotamine (e.g., quaternary ammonium silanes supplied by Aegis Environments or as SANITIZED QUAT T99-19 by Clariant Corp. and biguanides supplied as PURISTA by Avecia Inc.) chitosan castor oil derivatives based on undecylene acid or undecynol (e.g., undecylenoxy polyethylene glycol acrylate or methacrylate).

For certain implementations, the layers can have a loading level of the FP-PCM alone or in combination with microcapsules ranging from about 1 to about 100 percent by dry weight, most preferably from about 10% to about 75%. These FP-PCM, binders, additives and microcapsules can differ from each other or be the same such as by being liquids or solids at room temperature, having different shapes or sizes, by including shells formed of a different material or including different functional groups, or by containing a different phase change material or a combination thereof.

According to another embodiment, an article comprises a substrate and a starch or modified starch. Starch is a polymer, mainly of glucose, has crystallizable sections and carries hydroxyl groups. As such it is suitable as an FP-PCM for use in articles constructed in accordance with aspects of the present invention. In most cases, starch consists of both linear and branched chains. Different starches comprise various degrees of crystallizable sections, as found e.g. in standard differential scanning calorimetry (DSC) analysis. The crystallizable section consists of aligning side chains on the branched starch. Temperature and elevation, optionally combined with increased moisture leads to decrystallization (which is sometimes referred to as gelatinization). At lower temperature (and moisture), recrystallization takes place. Starch is hydrophilic, and, as such, also provides both for extension of the temperature regulating capacity of the FP-PCM and for recharging of the FP-PCM. Another feature of using starch and its derivatives, as well as some other hydrophilic FP-PCMs is the ability to adjust its transition temperature by adjusting its moisture content. Typically, the higher the moisture, the lower is the transition temperature.

According to various embodiments of the invention, various natural starches may be used, including, but not limited to, corn starch, potato starch and wheat starch. According to other embodiments, modified starch may be used, e.g. starch modified specifically for the article of the present invention or commercially available, modified starch. According to further embodiments, such modified starch is a result of acid hydrolysis for lowering its molecular weight (e.g. acid thinning) and/or a result of separating a fraction of it for enrichment in one of amylase or amylopectin. According to other embodiments, the starch to be used as an FP-PCM is chemically modified by attaching to it a new reactive function. According to various other embodiments, the chemically-modified starch is selected from commercially-available, chemically modified starches prepared for applications such as the food industry, the paper industry and others, e.g. hydroxyethyl starch, hydroxypropyl starch, starch acetate, starch phosphate, starch, cationic starches, anionic starches and their combinations. Modified starches and methods of their production are described in Chapter 16 of Corn Chemistry and Technology, edited by Watson and Ramstad, published by American Association of Cereal Chemists Inc., the teaching of which is incorporated herein by reference.

In accordance with one aspect the starch or modified starch is bound to the substrate via a covalent bond. According to another aspect it is bound via an electrovalent bond. According to various other embodiments, the covalently bound starch is selected from a group consisting of natural starch, thinned starch, amylase-enriched starch, amylopectin-enriched starch, hydroxyethyl starch, hydroxypropyl starch, starch acetate, starch phosphate, starch, cationic starches, anionic starches and their combinations. According to other embodiments, the electrovalently bound starch is selected from a group consisting of starch acetate, starch phosphate, starch, cationic starches, anionic starches and their combinations.

An article constructed in accordance with one aspect of the present invention comprises a substrate and at least one of gelatin, gelatin solutions and modified gelatin. Gelatin is a polymer mainly containing repeating sequences of glycine-X-Y-triplets, where X and Y are frequently proline and hydroxyproline amino acids. These sequences are responsible for the triple helical structure of gelatins and their ability to form thermally and reversible gels.

The formation of these phase changing structures are greatly dependent on the molecular weight, molecular structure, degree of branching, gelatin extraction process from collagen, natural source of collagen, temperature, pH, ionic concentration, crosslinks, reactive groups, reactive group modifications, presence of amino acids, purity, solution concentrations, etc.

Gelatins can provide for latent heat properties as outlined in "Studies of the Cross-Linking Process in Gelatin Gels. III. Dependence of Melting Point on Concentration and Molecular Weight": Eldridge, J. E., Ferry, J. D.; Journal of Physical Chemistry, 58, 1954, pp 992-995.

Gelatin can be easily modified by reaction and crosslinking with many compounds such as crosslinkers and modifiers outlined in above detailed description. Crosslinking agents such as aldehydes where formaldehyde and glutaraldhyde may be used. Isocyanates and anhydrides may be used to both modified the properties of the gelatin and provide for reactive functional groups for bonding to substrates.

Gelatin is hydrophilic, and as such also provides both for extension of the temperature regulating capacity of the FP-PCM and for recharging of the FP-PCM. Another important feature of using gelatins and its derivatives, as well as some other hydrophilic FP-PCM is the ability to adjust its transition temperature by adjusting its moisture content and polymer structure, i.e. molecular weight.

According to one embodiment, in an article, the gelatin or modified gelatin is bound to the substrate in a covalent bond or an electrovalent bond. According to various embodiments the gelatin can be in the form of a solution which is contained within the substrate.

Figure 2:
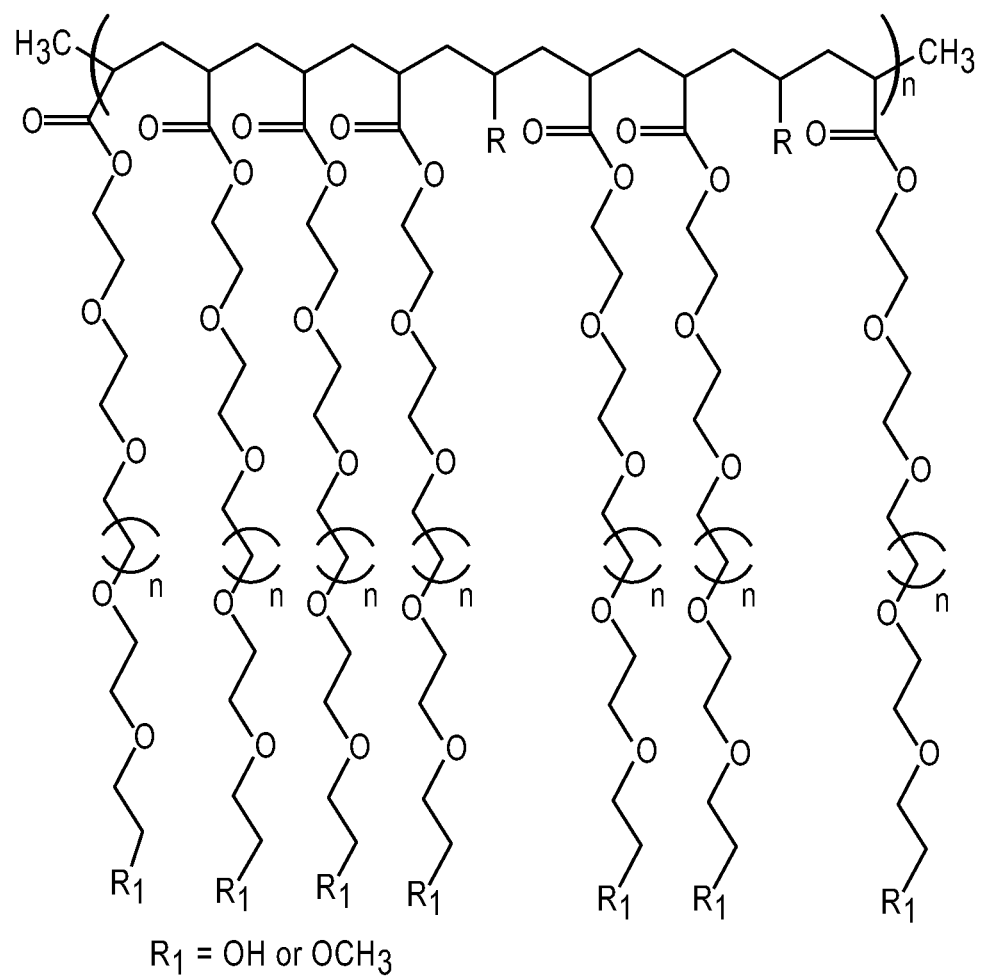

FIGS. 1 and 2 are schematic drawings of FP-PCMs used in accordance with an article constructed in accordance with various aspects of the present invention. Both are composed of a backbone chain and side chains. The FP-PCM in FIG. 1 represent long chain alkyl polyacrylate or polymethacrylate, and 1A-1C where 1A is long chain alkyl vinyl esters, 1B is long chain vinyl ethers and 1C is long chain alkyl olefins.

Figure 2A:
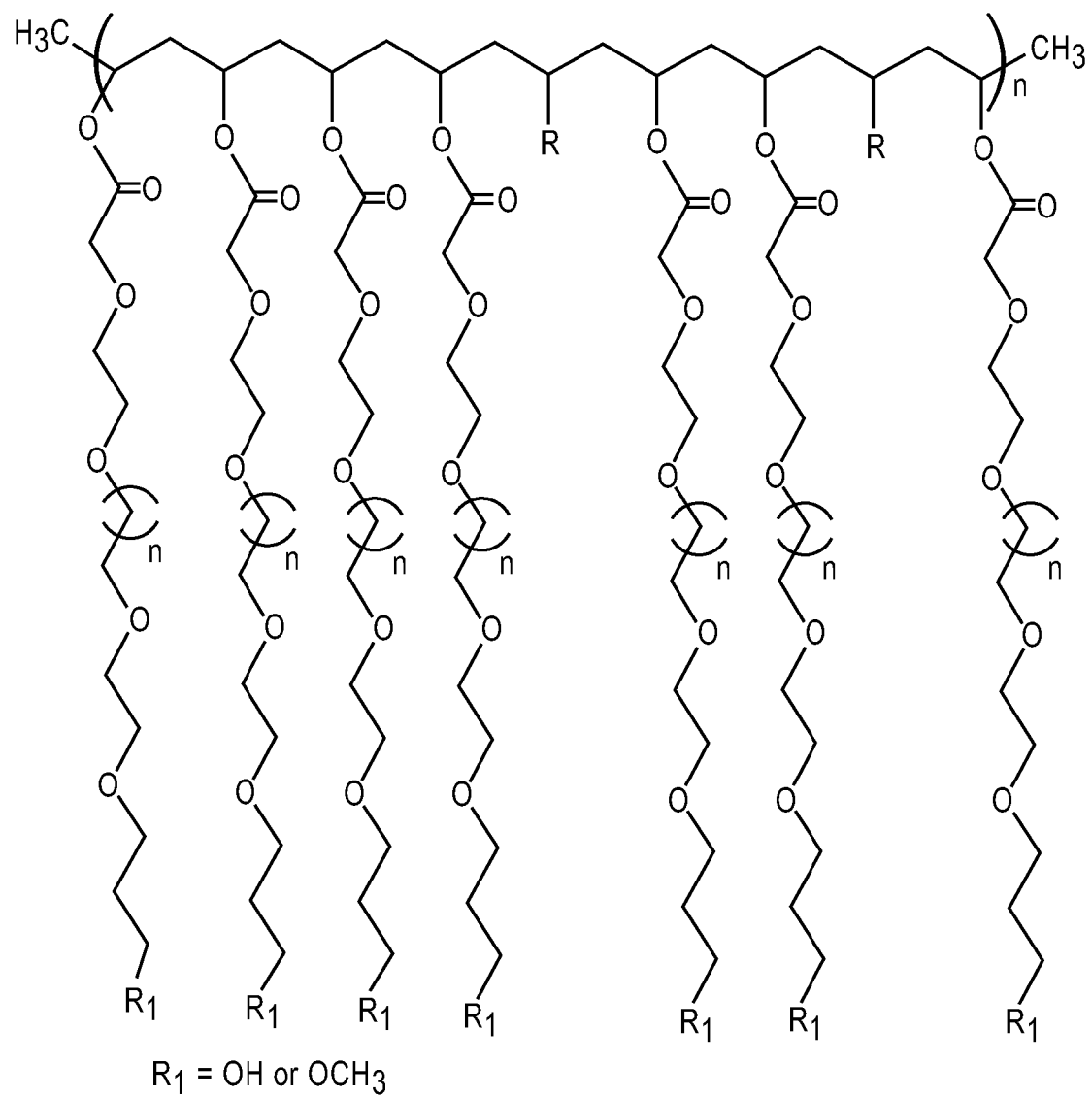
Figure 2B:
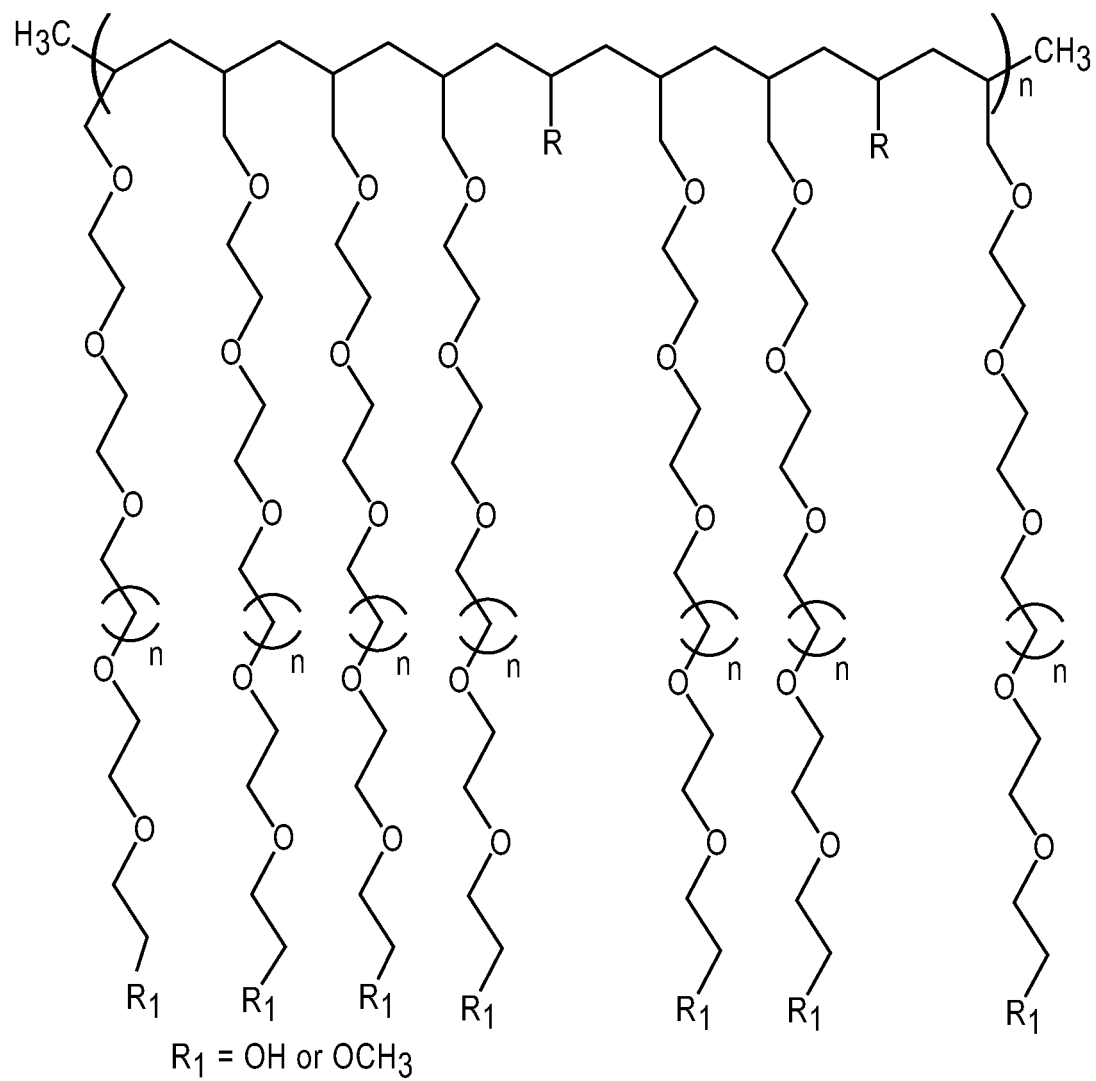

FIGS. 2A and 2B represent long chain glycol polyacrylates or polymethacrylates, where 2A is long chain glycol vinyl esters and 2B is long chain glycol vinyl ethers.

In FIGS. 1 and 2, R represents one or more of the reactive functions(s) described above. In those figures, the functions are drawn along the backbone, but that is only one option. As indicated above, the functions could also be placed at the end(s) of the backbone, on the side chains and any combination of those. Each FP-PCM may have a single or multiple reactive functions. FP-PCM may also carry multiple reactive functions of a similar chemical nature or a combination of reactive functions of different chemical nature. The length of the side chains may vary in different embodiments as shown by the variable chain length n.

Figure 5A:
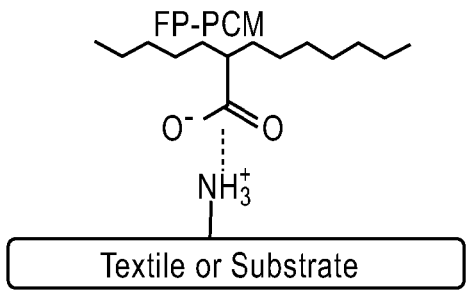
FIGS. 5A-5F are various embodiments of functional polymeric PCMs interacting with a substrate.
Figure 5B:
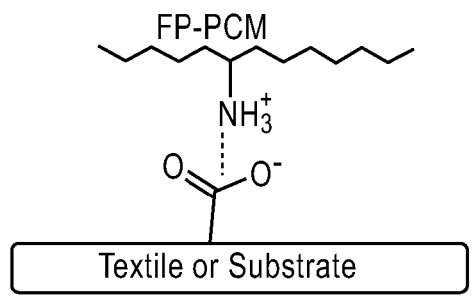
Figure 5C:
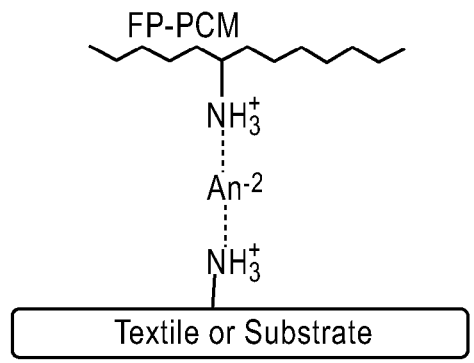
Figure 5D:
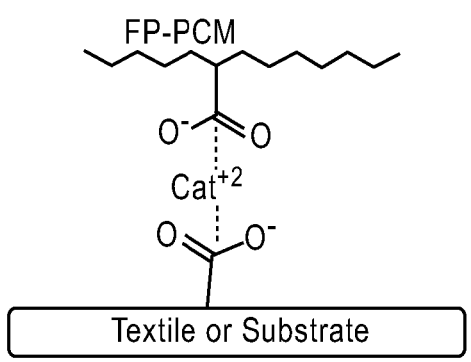
Figure 5E:
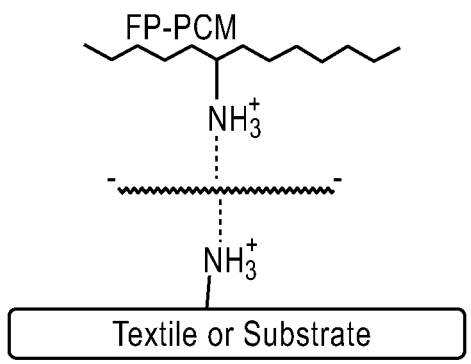
Figure 5F:
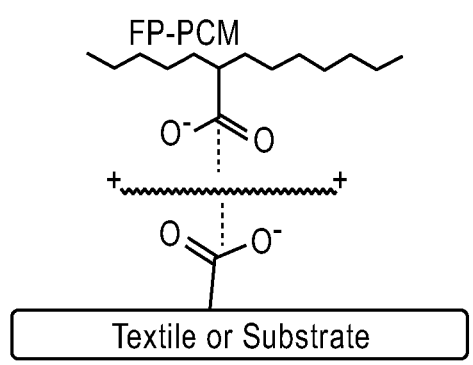

With reference to FIGS. 5A-5F, FIG. 5A drawing depicts an acidic or low pH carboxyl functional FP-PCM ionically interacting with a basic or high pH amino functional substrate. FIG. 5B depicts basic or high pH amino functional FP-PCM ionically interacting with an acidic or low pH carboxyl functional substrate. FIG. 5C depicts basic or high pH amino functional FP-PCM and a basic or high pH amino functional substrate being neutralized and ionically bound or "crosslinked" with an anion such as an amine. FIG. 5D depicts an acidic or low pH carboxyl functional FP-PCM and an acidic or low pH carboxyl functional substrate being neutralized and ionically bound or "crosslinked" with a cation such as a metal salt. FIG. 5E depicts basic or high pH amino functional FP-PCM and a basic or high pH amino functional substrate being neutralized and ionically bound or "crosslinked" with negatively charged organic compound such as dicarboxy functional polymer or dicarboxy functional FP-PCM. FIG. 5F depicts an acidic or low pH carboxyl functional FP-PCM and an acidic or low pH carboxyl functional substrate being neutralized and ionically bound or "crosslinked" with positively charged organic compound such as diamine functional polymer or diamine functional FP-PCM.

Figure 6A:
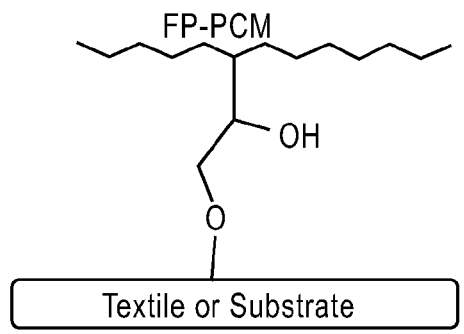
FIGS. 6A-6D are further embodiments of functional polymeric PCMs interacting with a substrate.
Figure 6B:
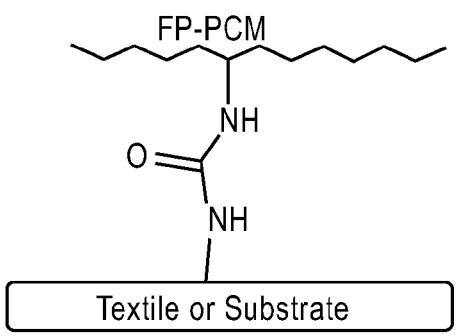
Figure 6C:
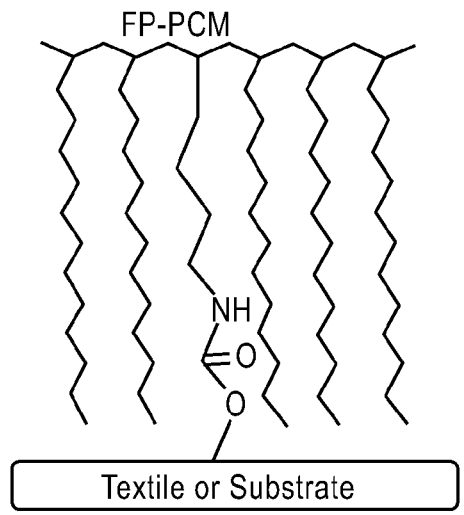
Figure 6D:
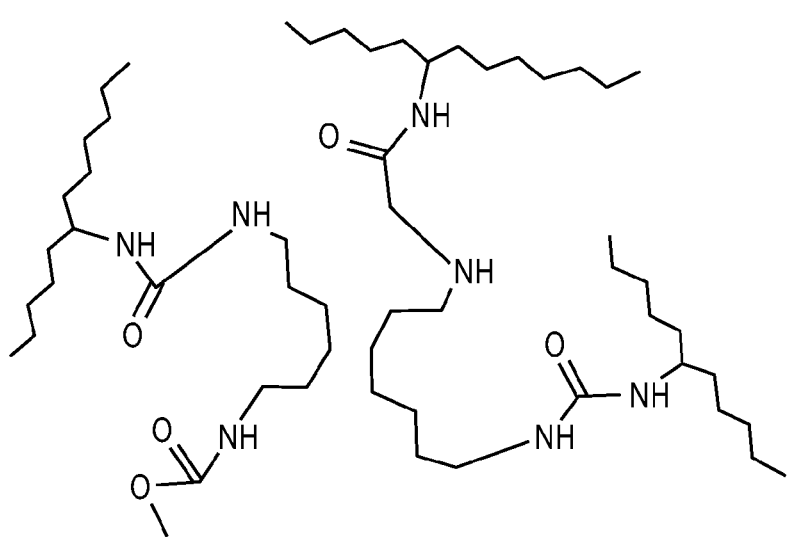

With reference to FIGS. 6A-6D, FIG. 6A depicts a covalent ether bond from the reaction of an FP-PCM epoxy and hydroxyl on a cellulose substrate. FIG. 6B depicts a covalent urea bond from the reaction of an FP-PCM isocyanate and amine from a proteinceous substrate such as wool or silk. FIG. 6C depicts a covalent urethane bond from the reaction of an FP-PCM isocyanate on the end of a side chain and hydroxyl from a cellulose substrate. FIG. 6D depicts a covalent urea and urethane bonds from the reaction of amine function, FP-PCMs, multifunctional isocyanate crosslinker/binder, and hydroxyl from a cellulose substrate.

EXAMPLES

The following examples are illustrative of aspects of the present invention but are not meant to be limiting under 35 U.S.C. § 112 of the United States Patent Laws, Article 123(2) of the European Patent Laws or any corresponding national country patent laws concerning the adequacy of the written description. By giving these examples, it is submitted that variations in the scope of the test results and corresponding implementations and claim scope are clearly and unambiguously disclosed to one of skill in the art.

Example 1—Preparation of Polyglycidyl Methacrylate

In a flask equipped with stirrer, condenser, nitrogen purge and temperature controller was reacted:

| Ingredients | wt. |
|---|---|
| 1.) n-pentyl propionate (Dow Chemical, Midland MI) | 37.6 |
| 2.) Glycidyl methacrylate (Dow Chemical, Midland MI) | 85.5 |
| 3.) Di-t-amyl peroxide (Sigma-Aldrich Corp. Milwaukee WI) | 5.4 |
| 4.) Di-t-amyl peroxide (Sigma-Aldrich Corp. Milwaukee WI) | 0.2 |

1 was added to the flask and heated to 152° C. under nitrogen. #2 and #3 were combined and added slowly to reaction flask over 5.5 hours. This was let react and additional 0.5 hours, then #4 added, let react for 1.0 hour then cooled to yield a 69.4% solution of polyglycidyl methacrylate. This solution was dried for 4 hrs @ 120° C. in a forced air oven to yield 100% dried polyglycidyl methacrylate.

Example 2—Preparation of Polymeric PCM

In a flask equipped with stirrer, condenser, nitrogen purge and temperature controller was reacted:

| Ingredients | wt. | functional eqiv. |
|---|---|---|
| 1.) 95% Palmitic Acid | 36.15 | 0.141 |
| 2.) Dried polyGMA from Ex. 1 above | 20.06 | 0.141 |

1 was added to the flask and heated to 130° C. under nitrogen. #2 was added slowly to reaction flask over 0.5 hours. This was let react and additional 3.0 hours, then cooled to yield a polymeric PCM with melt point of 38.5° C. and 63.1 J/g latent heat.

Example 3—Preparation of Polymeric PCM

In a flask equipped with stirrer, condenser, nitrogen purge and temperature controller was reacted:

| Ingredients | wt. | functional eqiv. |
|---|---|---|
| 1.) 95% Myristic Acid | 34.67 | 0.152 |
| 2.) Dried polyGMA from Ex. 1 above | 21.60 | 0.152 |

1 was added to the flask and heated to 130° C. under nitrogen. #2 was added slowly to reaction flask over 0.5 hours. This was let react and additional 3.0 hours, then cooled to yield a polymeric PCM with melt point of 16.1° C. and 29.8 J/g latent heat.

Example 4—Preparation of Polystearyl Methacrylate Polymeric PCM

In a flask equipped with stirrer, condenser, nitrogen purge and temperature controller was reacted:

| Ingredients | wt. |
|---|---|
| 1.) n-pentyl propionate (Dow Chemical, Midland MI) | 36.1 |
| 2.) SR324 Stearyl methacrylate (Sartomer Co., Exton PA) | 94.0 |
| 3.) Glycidyl methacrylate (Dow Chemical, Midland MI) | 6.0 |
| 4.) Di-t-amyl peroxide (Sigma-Aldrich Corp. Milwaukee WI) | 2.7 |
| 5.) Di-t-amyl peroxide (Sigma-Aldrich Corp. Milwaukee WI) | 0.5 |

1 was added to the flask and heated to 152° C. under nitrogen. #2, #3 and #4 were combined and added slowly to reaction flask over 3.5 hours. This was let react and additional 1.0 hours, #5 added, let react for 1.5 hour then cooled to yield a 69.7% solution of polystearyl methacrylate-co-glycidyl methacrylate with a melt point of 31.1° C. and 83.8 J/g latent heat.

Example 5—Preparation of Wash Durable Temperature Regulating Textiles with Improved Latent Heat Content Desized, unbleached, undyed cotton fabric was treated by immersing into solutions of the polymeric PCMs with and without additional crosslinkers or fixatives. The immersed fabrics were then padded to remove excess solution dried for 4 minutes @ 190° C. The fabrics where rinsed with warm tap water to remove any unreacted polymer then air dried overnight and measured for latent heat content. The fabrics were then washed 5 times per AATCC 143.

| Ingredients | #1 | #2 | #3 |
|---|---|---|---|
| | Weight (grams) | | |
| Polymeric PCM Ex. 2 | 5.13 | 5.25 | |
| Cymel 385 (Cytec Industries, Inc., West Patterson, NJ) | 1.04 | | |
| Bayhydur VPLS 2306 (Bayer Polymers, Pittsburgh PA) | | 1.18 | |
| Acetone | 10.68 | 11.79 | |
| Polymeric PCM Ex. 4 | | | 30.0 |
| Wash Durability and Latent Heat Content (J/g) | | | |
| Treated Fabric | 8.1 | 14.5 | 37.3 |
| 5x Washes | 5.8 | 12.0 | 31.2 |

Example 6

Various polymeric PCMs were made similar to example 4 above, but the mol. wt. was varied by changing the amount of peroxide initiator or changing the polymerization solution solids.

Example 6 Polymeric PCM Molecular Weight Results

| Sample | DSC | J/g | Melt Peak | Mn | Mw | Mz | Pd |
|---|---|---|---|---|---|---|---|
| 4-123, mfg at 70% solids | Good | 83.8 | 31.1 | 2670 | 8040 | 14600 | 3.01 |
| 4-135, mfg at 75% solids | Acceptable | 73.5 | 33.5 | 4170 | 21400 | 50400 | 5.13 |
| 4-144, mfg at 100% solids | Poor | 63.6 | 26.2 | 4680 | 39200 | 232400 | 8.38 |

Example 7

Above polymeric PCM, 4-123, was dried to 100% solids then added to various polymer fiber solutions both in the lab and in production pilot plant. These solutions were either spun into fiber or cast into films, coagulated, and dried to yield polymeric PCM modified products. Solution A consisted of Acordis Itaconic acid func. CFP polyacrylonitrile polymer dissolved in 1:1 NaSCN:$H_2O$ to give a 10% final solution. Solution B consisted of Novaceta® diacetate dissolved in water:acetone mixture to give a 26.6% solids solution in a wt. ratio of cellulose diacetate/$H_2O$/Acetone, 26.6/3.9/69.5. Solution C was based on Novaceta pilot run using polymeric PCM produced at Ortec Inc.

Example 7 Fiber and Films

| Sample | % FP-PCM | Theory J/g | Measured J/g | Thermocycle and $C_6$ Extr. | % <Theory |
|---|---|---|---|---|---|
| Sol. A | 15.0 | 12.6 | 8.0 | | |
| Sol. B | 10.0 | 8.4 | 4.6 | 5.9 | 30 |
| Sol. C | 10.0 | 7.1 | 2.4 | 2.9 | 59 |

In addition to the above disclosure concerning functional polymeric phase change material application and the use with various substrates, the disclosure below focuses on how using a more precisely branched polymer can give more precise and repeatable control of a copolymer addition. It is contemplated that each of the above examples 1-7, and the embodiments shown in FIGS. 1-6 may be modified to utilize the precisely branched polymers disclosed and discussed below. One of skill in the art would readily recognize how to incorporate the precisely branched polymers into the examples above and into variations of the above examples.

Standard polymerizations do not give precise and repeatable control of the comonomer addition because the catalysts generally add co-monomers in a random fashion. As discussed above, many polymers currently available commercially have random monomer incorporation. Current catalysts and polymerization technologies produce polymers with "drifting copolymer" structures where polymer chains in the product have a wide range of compositions of the comonomers. Due to the randomness of this comonomer addition, less control can be exerted over the thermal properties of the copolymer such as melt/crystallization temperature and the amount of crystallization. The amount of crystallization can be expressed as a percentage crystallinity, latent heat, heat of fusion or Joules per gram.

Precise branching control as discussed below allows for greater latent heat content at a given melt temperature versus random comonomer incorporation which requires more comonomer to give the same melt temperature, leading to lower percentage crystallinity and lower latent heat.

Figure 7:
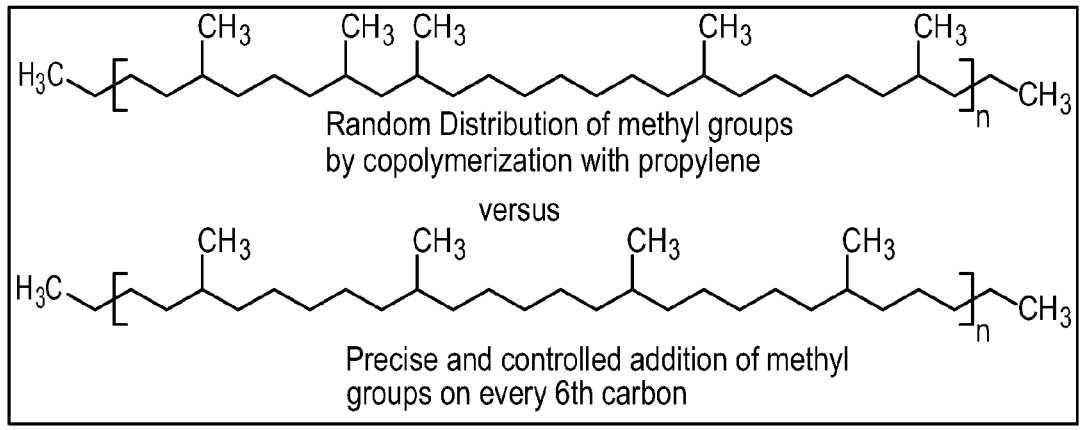
FIG. 7 shows one embodiment of the precisely branched polymers compared with randomly distributed polymers.
Figure 8:
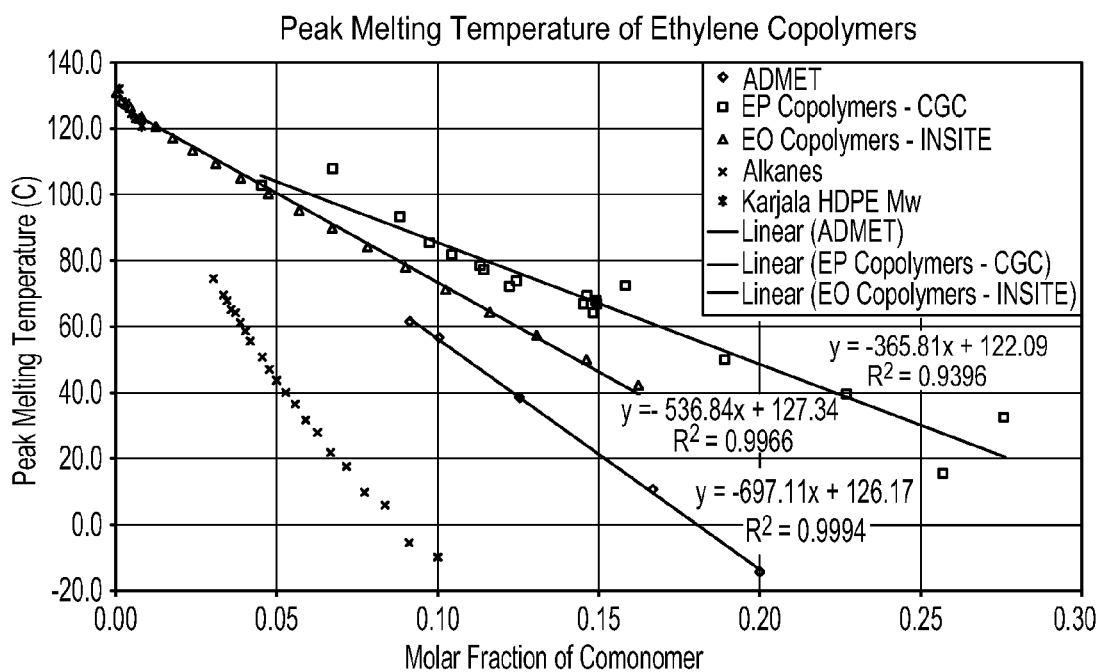
FIG. 8 is a graph depicting the peak melting point of various copolymers.
Figure 9:
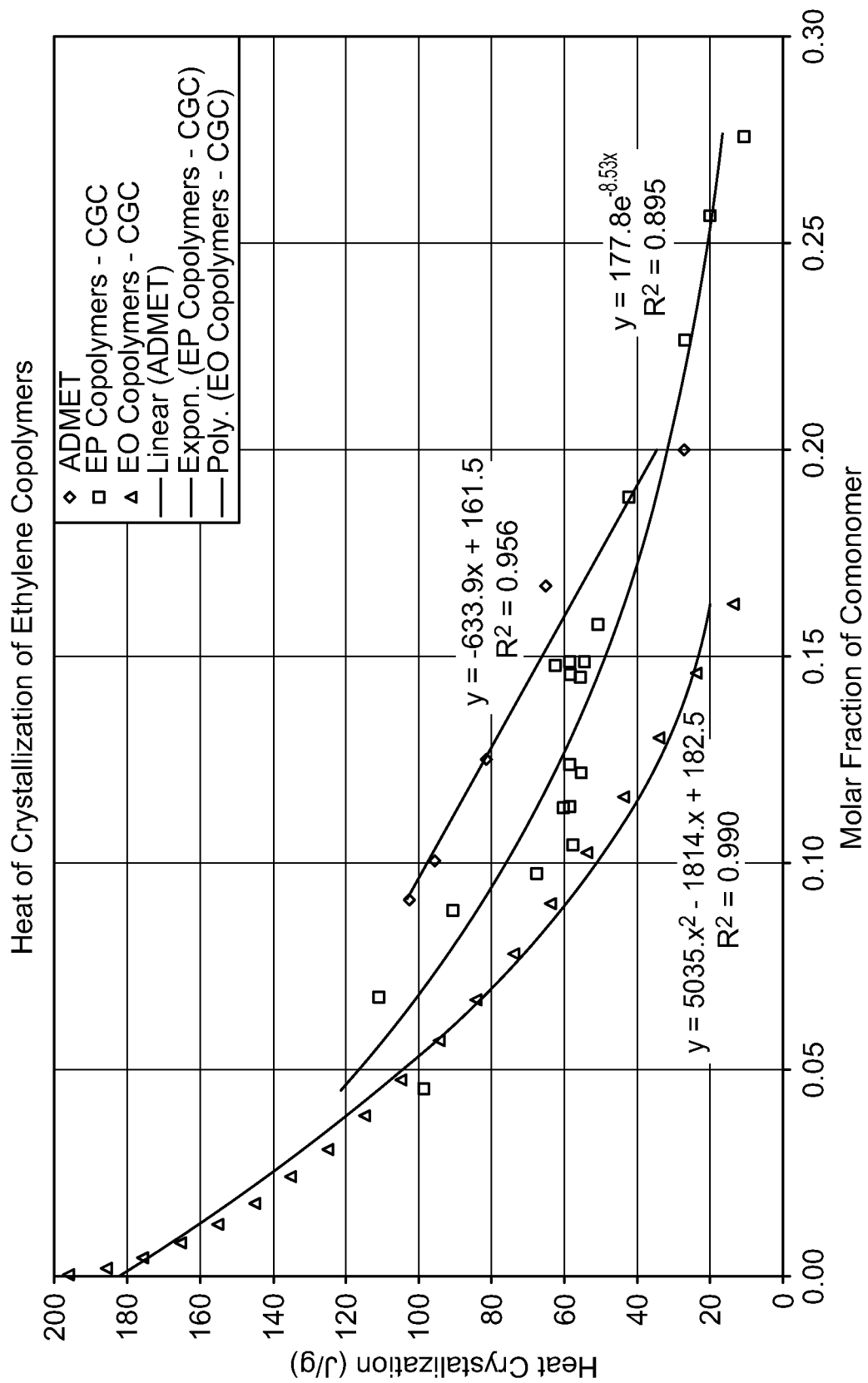
FIG. 9 is a graph depicting the heat of crystallization of various copolymers.

With general reference to FIGS. 7-9, various graphs are shown that illustrate the difference in both melt temperature and latent heat. In FIGS. 7-9 the precisely branched polymers are labeled as ADMET. In the various embodiments, figures and examples, ADMET stands for Acyclic Diene Metathesis Polymerization and generally represents polymers with precisely placed methyl branches.

It is well know in the industry, that for polyolefin polymers the melting temperature and latent heat are controlled by the longest carbon segments in the polyolefin backbone. For instance in polyethylene random copolymers, the distribution of ethylene sequences vary. In the case of polyethylene copolymers, thick crystal lamella can be formed from the longer ethylene sequences which will result in higher melting temperatures. The shorter ethylene sequences and/or branches will not be incorporated into these crystallites or lamella resulting in lowered heats of fusion or Joules per gram.

In accordance with one embodiment and example, a precisely branched polyethylene material having equal ethylene sequences yields the following features: a faster decrease in melting temperature at lower branch content; better control of the melting temperature; and an overall higher amount of ethylene sequences incorporated into the lamella or crystallite, yielding higher latent heats.

Therefore, aspects of the invention and the use of these precisely controlled copolymers yields materials with phase change materials exhibiting enhanced temperature regulating, heat absorbing, and heat releasing properties. In order to obtain a preferred PCM with melting temperatures between 10-50° C. in one embodiment, between 10-45° C. in another embodiment and between 0-100° C. in yet another embodiment, and a latent heat of fusion of >25 Joules per gram in one embodiment, >5 Joules per gram in another embodiment, and between 5 and 150 Joules per gram in yet another embodiment, a PCM in one example has a structure with one or more of the following features:

The overall polymer molecular weight (n) is between 100-10,000,000, between 1000-1,000,000 or between 10,000-500,000 in various embodiments.

With the molecular weight distribution expressed as polydispersity or Pd=Mn/Mw, it is between 1-20, between 1-10, or between 1-3 in various embodiments.

The ethylene length between branches is between 5-50, between 10-40, or between 10-20 in various embodiments.

Figure 11:
FIG. 11 is a diagram expression of R1, R2, R3, R4, and R5.

The length described above can be expressed in a number of ways such as number of m units in FIG. 11, branches per 1000 carbons (branches/1000 C), mole % branches or weight % branches. The PCM structure also has the following characteristics in one or more embodiments:

The number of m units is between 0-45, between 5-35 or between 5-15 in different embodiments.

There are between 200-20, between 100-25 or between 100-50 branches per 1000 carbons (branches/1000 C) in different embodiments.

The mole % of the branches is 4-50%, between 5-30% or between 10-30% in different embodiments.

The weight percentage of the branches is between 5-50%, between 6-30% or between 10-30% in different embodiments.

In some embodiments it is preferred that the branches are methyl branches from propylene as the comonomer and that propylene is 20-30 mole % of the polymer. In another embodiment, propylene is 27-39 weight % of the polymer In FIG. 11, illustrating one embodiment, R1 may be any of CH3, C2H5, CnH2n+1, OCH3, OC2H5, or any functional group, polar group, halogen group, their normal, branched or mixed group. In certain embodiments R1 is selected from either CH3 or OCH3. In FIG. 11, R2=H, CH3 and in certain specific embodiments, R2 is limited to H.

In FIG. 11, R3=H, CH3 or some concentration of a selected functional group, polar group or halogen group. In certain embodiments, R3 is limited to CH3 or to one or more concentrations of a functional group In FIG. 11, R4 and R5 are polymer end groups and can be H, CH3 or any functional group, polar group or halogen group, salt, metal, catalyst end, crosslinking group, another polymer chain to form copolymers (block, graft, etc.). In some embodiments, R4, R5 can be the same or different. In certain embodiments, R4 and R5 are limited to H, CH3 or any functional group.

In accordance with other aspects R1, R2, R3, R4, and R5 can have some degree of stereocontrol or stereochemistry associated with them. For example:

R1, R2, R3 may be atactic, isotactic or syndiotactic.

R1, R2, R3 may also be controlled for chirality to yield L- and D-chiral homo and copolymers (or another way of stating is R- and S-polymers).

Different polymer architectures based on the stereochemistry of the polymer chain can lead to various crystalline complexes. For example, syndiotactic homo- and copolymers can complex with isotactic homo- and copolymers. Polymers of opposite chirality can be mixed to form a racemic stereocomplex. In one embodiment, a certain amount of isotactic L-polymer can be mixed with an amount of isotactic D-polymer to yield a racemic stereocomplex with thermal and physical properties different than the L- or D-chiral homopolymers. (A polymer stereocomplex is defined as a stereoselective interaction between two complementing stereoregular polymers, that interlock and form a new composite, demonstrating altered physical and thermal properties different than the parent polymers.)

These syndiotactic, isotactic or L- and D-chiral segments can be in different polymer chains (homopolymer segments) or in the same polymer (stereoblock copolymers segments). The syndiotactic, isotactic or L- and D-chiral segments can make up anywhere between 1-100% of the polymer or copolymer as well as various intermediate percentage ranges.

The syndiotactic, isotactic or L- and D-chiral segments can be mixed in a ration between 9:1 and 1:9 to give complete or partial stereocomplex formation and subsequent thermal and physical property adjustment. Other crystalline complexes may also be utilized such as complexes between different polymers such as polyamides and polyesters, cationic/anionic, polyethers/polyacids, and triple helices.

R3, R4, R5 can be any functional group, polar group or halogen group, salt, metal, catalyst end, crosslinking group, or any of the following functional groups: acid anhydride groups, amino groups and their salts, N-substituted amino groups, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

The crosslinking groups discussed above may also include the ability to reversibly or irreversibly change the crosslink by thermal, sonic, photon, pressure, or chemical (water, solvents, ions, etc.) energy.

Various other methods of functionalization are described shown in the following references, the details of which are incorporated by reference into the present application: Synthesis of Functional Polyolefins using Metallocenes: A Comprehensive Review; Atiqullah M., et. al.; Polymer Reviews, 50:178-230, 2010; Comprehensive Organometallic Chemistry III: 11.20-Polymerization of Alkenes; Elsevier Ltd.; Fujita T., Makio H.; Vol. 11, 691-734, 2007; Functionalized Ethylene Copolymers and Materials via Olefin Metathesis Polymerization; Baughman, T., Univ. of Florida Dissertation, 2006.

Figure 10:
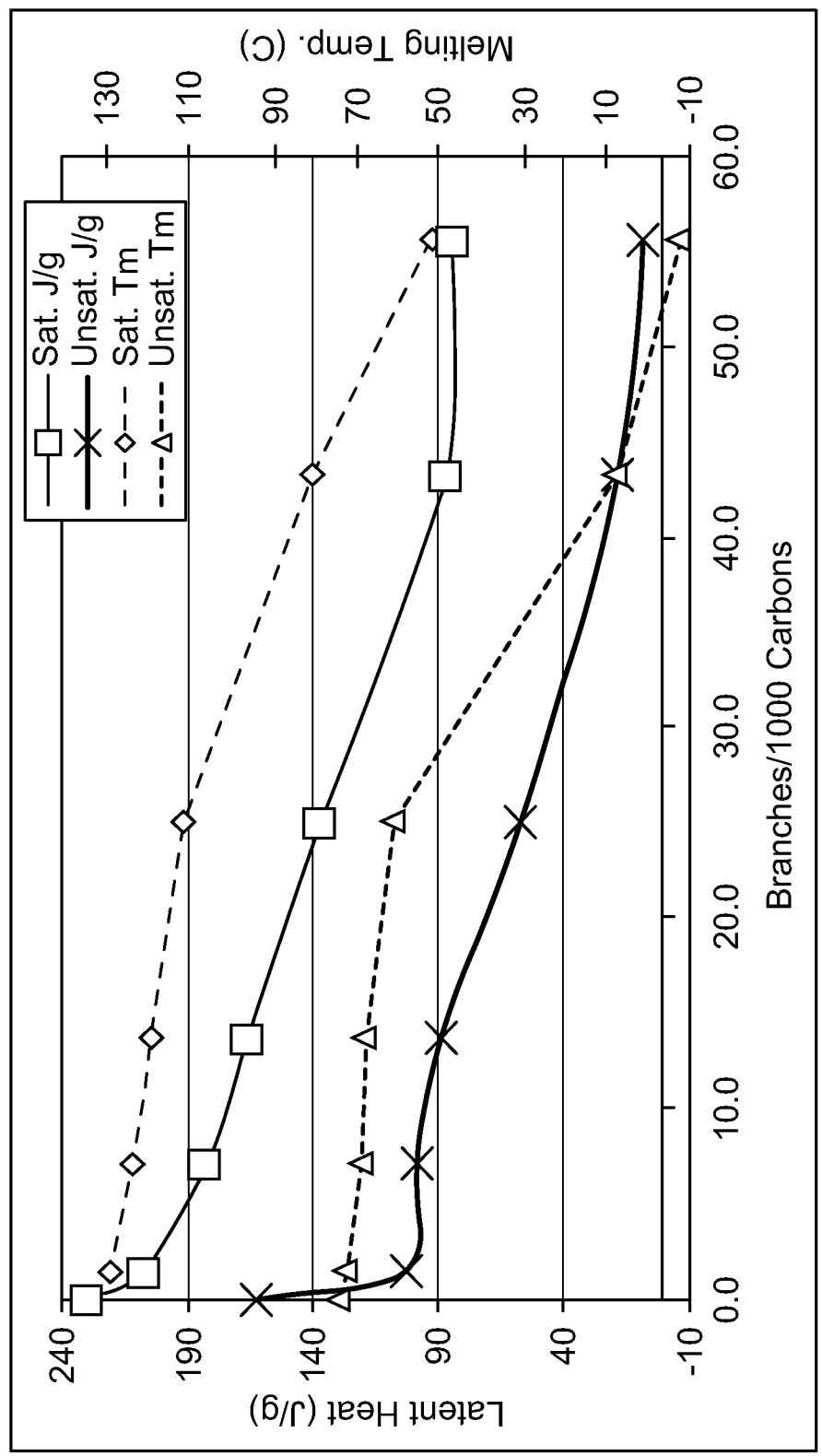
FIG. 10 is a graph depicting the latent heat and melting point of various copolymers.
Figure 12:
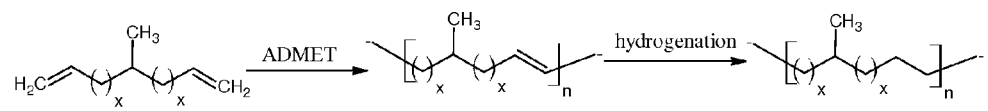
FIG. 12 is a diagram expression of ADMET polymerization and subsequent hydrogenation.

In accordance with another aspect, the polymer may have a certain degree of unsaturation or include double and triple bonded atoms in the polymer. For instance, alkene or alkyne bonds. This unsaturation (not all valence electrons are "saturated" or reacted to other atoms) can be incorporated and controlled by the monomers used in the polymerization (isoprene, butadiene, α-olefins, etc.), hydride elimination (β-hydride elimination, etc.), various polymerization mechanisms (ring-opening metathesis polymerization (ROMP), acyclic diene metathesis (ADMET described herein, etc.) or controlled hydrogenation/dehydrogenation. For instance, as shown in FIG. 12 and FIG. 10, examples of making the invention by ADMET polymerization and subsequent hydrogenation are shown. FIG. 10 shows the effect of unsaturation on the thermal properties.

As can be seen, unsaturation causes a lower melting temperature and also slightly lower latent heat of fusion, but by controlling the level of unsaturation, one can also control the thermal properties. In some embodiments the unsaturation is 0-99 mole %. In other embodiments the unsaturation is 0-15 mole %. In various other embodiments, various intermediate ranges of mole % are utilized.

The isomeric orientation of the double bond can also have an effect on the properties of the unsaturated polymer. The cis/trans orientation of the double bond can also be controlled by the hydrogenation catalyst or the hydrogenation process conditions such as time, temperature, pressure, etc.

The isomer ratio, unsaturation and double bond orientation will vary depending on the comonomer composition, comonomer distribution and polymerization conditions. One goal of a composition in accordance with an aspect of the present invention is to maximize latent heat in the preferred temperature range.

Copolymer segments used in connection with aspects of the present invention can be copolymers or blended with any of the other polymers/copolymers disclosed herein. In addition, copolymer segments used in connection with aspects of the present invention can be high melt or low melt.

Method of Manufacturing Precisely Branched Polymers

The following are examples of methods that the polymers described herein may be manufactured. The following examples are illustrative of aspects of the present invention but are not meant to be limiting under 35 U.S.C. § 112 of the United States Patent Laws, Article 123(2) of the European Patent Laws or any corresponding national country patent laws concerning the adequacy of the written description. By giving these examples, it is submitted that variations in the scope of the test results and corresponding implementations and claim scope are clearly and unambiguously disclosed to one of skill in the art.

ADMET Polymers

Figure 13:
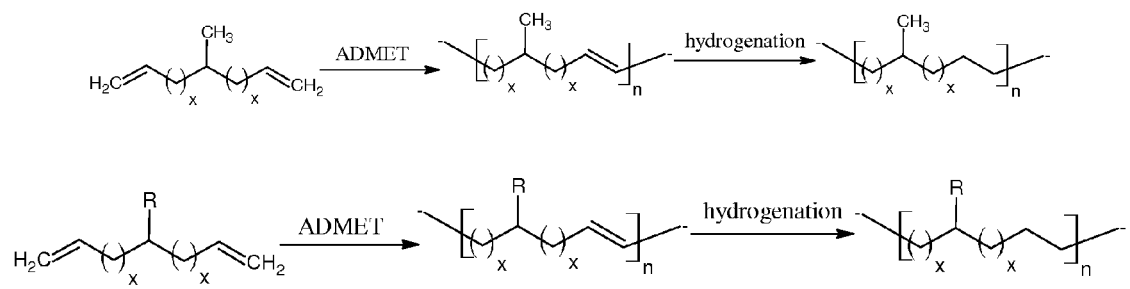
FIG. 13 is a diagram expression of ADMET polymers.

The x number of CH2 units in the examples of FIG. 13 can be the same number or different number. Preferred is x is same number of CH2 units.

Ring-Opening Metathesis Polymerization

The x number of CH2 units in the examples of FIG. 14 can be the same number or different number. Preferred is x is same number of CH2 units yielding a symmetrical ring.

Controlled β-Hydride Elimination/Reinsertion

In FIG. 15, the preferred enchainment is β,ω-enchainment

Controlled Comonomer Addition

Figure 16:
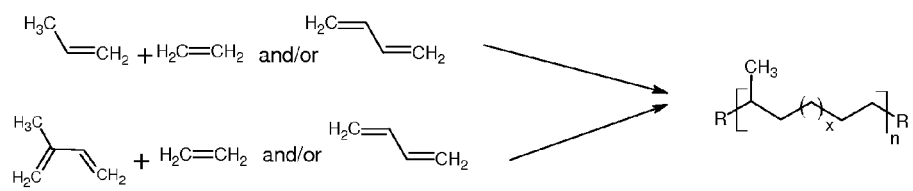
FIG. 16 is a diagram expression of controlled comonomer addition.

For instance, polypropylene or isoprene providing the branching monomer and ethylene or butadiene providing the spacer monomers. In FIG. 16, preferred is the copolymerization of ethylene and propylene.

For instance, the final polymer structure in FIG. 15 can be controlled by either the choice or combination of specific metallocene catalyst (i.e. catalyst A may yield standard α,β-olefin polymerization, catalyst B may yield β,ω-enchainment, catalyst C may yield standard α,ω-enchainment) mix of catalysts, monomer configuration or monomer stereochemistry, along with polymerization conditions such as polymerization time, temperature, concentration or solvents. The polymer yielded in FIG. 16 may be produced by: a.) specific catalysts/initiators or mix of catalysts initiators which preferably polymerize x number of ethylene units, then one propylene unit, x number of ethylene units, one propylene unit and thereon, b.) a living polymerization in which the monomers are delivered through a controlled feed, i.e. x units of ethylene are fed into reactor, polymerized, then 1 unit of propylene is feed into reactor polymerized onto the end of the living ethylene segment, x units of ethylene are again feed and polymerized onto the propylene unit to create another ethylene segment, 1 unit of propylene is then feed to create your precise segmented polymer, etc. or c.) the same type of controlled segments can be created by using different reactors where reactor 1 is feed controlled amounts of ethylene or polymerizes controlled segments of ethylene, and is then feed to reactor 2 which adds controlled amounts of propylene to the living ethylene segment. These multiple reactors can be in a loop or in series. The catalyst, initiators and conditions in the reactor can be the same or different.

Figure 17:
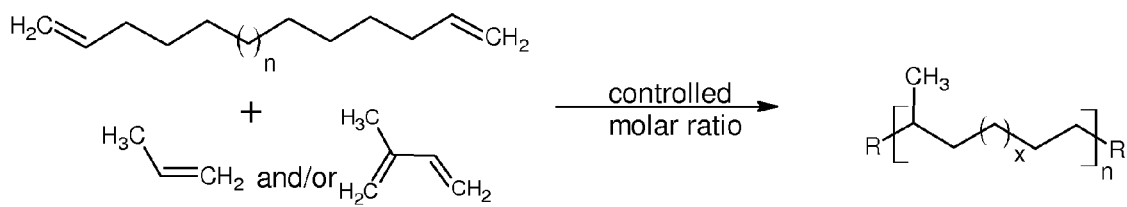
FIG. 17 is a diagram expression of polymer manufacturing.
Figure 18:
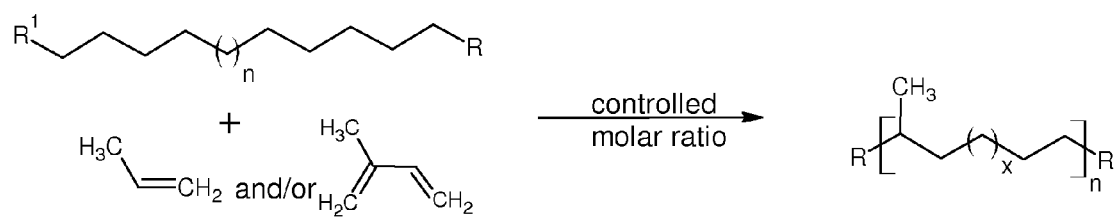
FIG. 18 is a diagram expression of another polymer manufacturing.

The polymers in FIGS. 17 and 18 can be manufactured by the controlled feed ratio or controlled mole ratio of the long chain monomer with the short chain branch units. The short chain branch units would add only one unit on the end of the long chain monomer, and then subsequently polymerize. This controlled single unit addition can be controlled by the monomer feed addition, molar ratios, catalyst, process conditions or reactivity ratios of the monomers, i.e. the short chain monomer will only add to the long chain monomer due to preferred reactivity. For instance, by controlling the R group on the long chain monomer ($R^1$ and R can be same or different), you can selectively add short chain monomer units to one or both ends.

The polymerization conditions and method of manufacturing these polymers by any of the above routes is very dependent on the polymerization conditions, the catalysts (metals, ligands, ligand stereochemistry, etc.), co-catalysts, activators, stabilizers, solvents, additives and temperatures. The options, combinations and permutations of the above polymerization conditions are to exhaustive to list or describe here but the above are described in the following references, the details of which are incorporate by reference into the present application: Living Alkene Polymerization New Methods for the Precision Synthesis of Polyolefins; Domski, G. J., et. al.; Prog. Polym. Sci 32, 30-92, 2007; Alternating Stereospecific Copolymerization of Ethylene and Propylene with Metallocene Catalysts; Fan W., et. al., *Journal of the American Chemical Society*, 123 (39), 9555-9563, 2001; Morphology, Crystallization and Melting Behavior of Statistical Copolymers of Propylene with Ethylene, 1-Butene, 1-Hexene and 1-Octene; Kumar A., Dissertation for Virginia Polytechnic Institute and State University, 2001; Comparison of Propylene/Ethylene Copolymers Prepared with Different Catalysts; Stephens C. H., Journal of Applied Polymer Science, 100, 1651-1658, 2006; ADMET Linear-Low Density Polyethylene Synthesis, Characterization and Thermal Behavior of Precisely and Irregularly Sequenced Copolymers; Rojas G., Dissertation for Univ. of Florida, 2008; Random Block Copolymers via Segment Interchange Olefin Metathesis; Wagner N. L., et. al., Macromol. Rapid Commun. 29 1438-1443, 2008; ADMET Amphiphiles; Berda E. B., Dissertation for Univ. of Florida, 2008; Modeling Linear-Low Density Polyethylene: Copolymers Containing Precise Structures; Sworen J. C., Dissertation for Univ. of Florida, 2004; Solid State Olefin Metathesis; Oakley G. W., Dissertation for Univ. of Florida, 2004; Olefin Metathesis and Metathesis Polymerization, $2^{nd}$ Ed.; Academic Press Inc.; Ivin K. J., Mol. J. C., 1997; Polymerization of Ethene and Ethene-co-α-Olefin: Investigations on Short- and Long-Chain Branching and Structure-PropertyRelationships; Piel C., Dissertation for the Univ. of Hamburg, 2005; Practical Guide to Polyethylene, iSmithers Rapra Publ.; Vasile C., Pascu M., 2005; Olefin Metathesis, ChemFiles, Aldrich Chemical Co., Vol. 9, No. 6, 2009; Living Polymerization of α-Olefins with an α-Diimine Ni(II) Catalyst: Formation of Well-Defined Ethylene-Propylene Copolymers through Controlled Chain-Walking; Rose J. M., et. al, J. AM. Chem. Soc., 128, 4186-4187, 2006.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A temperature regulating article comprising:
a substrate; and
a temperature regulating composition bound to the substrate; wherein the temperature regulating composition comprises
a polymeric phase change material bound to the substrate, wherein the polymeric phase change material includes a branched polymer with equally spaced repeating sidechains each separated by at least three carbon backbone atoms, wherein the number of carbon backbone atoms between sidechains controls a degree of crystallization of the polymeric phase change material at a given transition temperature, wherein the polymeric phase change material includes between 20 and 200 branches per 1000 carbon atoms,
wherein the polymeric phase change material has a latent heat of at least 5 Joules per gram and a transition temperature between 0° C. and 40° C. dependent upon the number of carbon backbone atoms between sidechains, and
wherein the sidechains are selected from the group consisting of $CH_3$, $C_2H_5$, $C_nH_{2n+1}$, $OCH_3$, and $OC_2H_5$.

2. The temperature regulating article of claim 1, wherein the polymeric phase change material includes a mole percentage of the branches of between 4% and 50%.

3. The temperature regulating article of claim 1, wherein the polymeric phase change material includes a weight percentage of the branches of between 5% and 50%.

4. The temperature regulating article of claim 1, wherein the polymeric phase change material includes between 20 and 45 branch units per 1000 carbon atoms.

5. The temperature regulating article of claim 1, wherein the branches are methyl branches derived from propylene as the comonomer.

6. The temperature regulating article of claim 5, wherein the propylene is 20-30 mole percentage of the polymer.

7. The temperature regulating article of claim 5, wherein propylene is between 27-39 weight percentage of the polymer.

8. The temperature regulating article of claim 1, wherein at least one of the branches are selected from the group consisting of $CH_3$ and a functional group.

9. The temperature regulating article of claim 1, wherein at least one of the branches are selected from the group consisting of a functional group, a polar group, a halogen group, a salt, a metal, a catalyst end, and a crosslinking group.

10. The temperature regulating article of claim 1, wherein at least one of the branches have a degree of stereocontrol associated with them.

11. The temperature regulating article of claim 1, wherein at least one of the branches is controlled for chirality to yield L-chiral homo and copolymers.

12. The temperature regulating article of claim 1, wherein the polymer has a degree of unsaturation.

13. The temperature regulating article of claim 12, wherein the unsaturation is between 1-99 mole percentage.

14. The temperature regulating article of claim 1, wherein the polymer includes double bonded atoms.

15. The temperature regulating article of claim 1, wherein the substrate is selected from the group consisting of a fiber composition, a film composition, a laminated film composition and a coating composition.

16. A temperature regulating composition, comprising:
a polymeric phase change material, wherein the polymeric phase change material includes a branched polymer with equally spaced repeating sidechains each separated by at least three carbon backbone atoms, wherein the number of carbon backbone atoms between sidechains controls a degree of crystallization of the polymeric phase change material at a given transition temperature, wherein the polymeric phase change material includes between 20 and 200 branches per 1000 carbon atoms,
wherein the polymeric phase change material has a latent heat of at least 5 Joules per gram and a transition temperature between 0° C. and 40° C. dependent upon the number of carbon backbone atoms between sidechains, and
wherein the sidechains are selected from the group consisting of $CH_3$, $C_2H_5$, $C_nH_{2n+1}$, $OCH_3$, and $OC_2H_5$.

17. The temperature regulating article of claim 16, wherein the polymeric phase change material includes a mole percentage of the branches of between 4% and 50%.

18. The temperature regulating article of claim 16, wherein the polymeric phase change material includes a weight percentage of the branches of between 5% and 50%.

19. The temperature regulating article of claim 16, wherein the polymeric phase change material includes between 20 and 45 branch units per 1000 carbon atoms.

20. The temperature regulating article of claim 16, wherein the branches are methyl branches derived from propylene as a comonomer.

21. A temperature regulating composition, comprising:
a polymeric phase change material, wherein the polymeric phase change material includes a branched polymer with equally spaced repeating sidechains each separated by at least three carbon backbone atoms, wherein the number of carbon backbone atoms between sidechains controls a degree of crystallization of the polymeric phase change material at a given transition temperature, wherein the polymeric phase change material includes between 20 and 200 branches per 1000 carbon atoms,
wherein the polymeric phase change material has a latent heat of at least 5 Joules per gram and a transition temperature between 0° C. and 100° C. dependent upon the number of carbon backbone atoms between sidechains, and
wherein the sidechains are selected from the group consisting of $CH_3$, $C_2H_5$, $C_nH_{2n+1}$, $OCH_3$, and $OC_2H_5$.

22. The temperature regulating article of claim 21, wherein the polymeric phase change material includes a mole percentage of the branches of between 4% and 50%.

23. The temperature regulating article of claim 21, wherein the polymeric phase change material includes a weight percentage of the branches of between 5% and 50%.

24. The temperature regulating article of claim 21, wherein the polymeric phase change material includes between 20 and 45 branch units per 1000 carbon atoms.

25. The temperature regulating article of claim 21, wherein the branches are methyl branches derived from propylene as a comonomer.

* * * * *